(12) United States Patent
Hudson et al.

(10) Patent No.: US 8,155,946 B2
(45) Date of Patent: Apr. 10, 2012

(54) COMPUTERIZED METHOD AND SYSTEM FOR SEARCHING FOR TEXT PASSAGES IN TEXT DOCUMENTS

(75) Inventors: Richard Hudson, Munich (DE); Dean Jones, Munich (DE); Juergen Klenk, Groebenzell (DE); Guenter Schmidt, Munich (DE); Markus Woischnik, Munich (DE)

(73) Assignee: Definiens AG, Munich (DE)

( * ) Notice: Subject to any disclaimer, the term of this patent is extended or adjusted under 35 U.S.C. 154(b) by 2362 days.

(21) Appl. No.: 10/744,342

(22) Filed: Dec. 22, 2003

(65) Prior Publication Data

US 2005/0278164 A1  Dec. 15, 2005

(30) Foreign Application Priority Data

Dec. 23, 2002  (EP) .................................. 02028856

(51) Int. Cl.
*G06F 17/28* (2006.01)
(52) U.S. Cl. ................. 704/4; 704/257; 704/7
(58) Field of Classification Search ............... 704/1–10, 704/257, 270, 270.1, 251–255; 707/3, 5; 706/55

See application file for complete search history.

(56) References Cited

U.S. PATENT DOCUMENTS

| | | | |
|---|---|---|---|
| 5,933,822 A | 8/1999 | Braden-Harder et al. | 707/5 |
| 5,995,920 A * | 11/1999 | Carbonell et al. | 704/9 |
| 6,246,977 B1 * | 6/2001 | Messerly et al. | 704/9 |
| 6,263,335 B1 | 7/2001 | Paik et al. | 707/5 |
| 6,675,159 B1 * | 1/2004 | Lin et al. | 707/3 |
| 6,778,970 B2 * | 8/2004 | Au | 706/55 |
| 7,117,207 B1 * | 10/2006 | Kerschberg et al. | 707/5 |
| 7,185,001 B1 * | 2/2007 | Burdick et al. | 707/3 |

OTHER PUBLICATIONS

Simon C. Dik, "Functional Grammar," (1978). Foris Publications, Dordrecht, Holland, ISBN 90-70176-41-6.
Christiane Fellbaum, "WordNet: An Electronic Lexical Database," (1998) The MIT Press, Cambridge, Massachusetts, ISBN 0-262-06197-X.
Talmy Givón, ed., "Topic Continuity in Discourse," (1983) John Benjamins Publishing Company, Amsterdam/Philadelphia, ISBN 90-272-2863-9.
Xin Li and Dan Roth, "Exploring Evidence for Shallow Parsing," Department of Computer Science, University of Illinois at Urbana-Champaign, 2001, 7 pages.
Michael C. McCord, "Slot Grammar, A System for Simpler Construction of Practical Natural Language Grammars," IBM Research Center, Yorktown Heights, NY, 1990, pp. 118-145.
Rudi Studer, "Natural language and Logic: International Scientific Symposium," May 9-11, 1989 in Hamburg, Springer-Verlag, Berlin (1990), ISBN 3-540-53082-7 (see Slot Grammar by M. McCord at pp. 118-145).

(Continued)

*Primary Examiner* — Huyen X. Vo
(74) *Attorney, Agent, or Firm* — Imperium Patent Works; Darien K. Wallace

(57) ABSTRACT

A method is disclosed for searching for text passages in text documents. The method uses computerized prediction-based and ontology-based semantic language processing. Both the text passages that are to be located, as well as the text of the documents that are searched, are transformed on the basis of surface-syntactic and deep-syntactic information to generate a semantic network structure. The semantic network structure is linguistically processed based on information about other parts of the semantic network structure in order to improve the accuracy of the semantic network structure. Nodes in the semantic network structure are classified by linking the nodes in the semantic network structure to nodes in a pre-existing ontological network structure representing concepts in a language.

32 Claims, 15 Drawing Sheets

OTHER PUBLICATIONS

Gaizauskas R. et al., "A Combined IR/NLP Approach to Question Answering Against Large Text Collections," Proceedings of RIAO 2000 Content-Based Multimedia Information Access, 2000, 17 pages. (XP002289924).

Brasethvik T. et al., "A Conceptual Modeling Approach to Semantic Document Retrieval," Proceedings of the 14$^{th}$ International Conference on Advanced Systems Engineering, May 27-31, 2002, pp. 167-182 (XP002289925).

Litkowski K. C., "Question-Answering Using Semantic Relation Triples," 8$^{th}$ Text Retrieval Conference Trec-8, Nov. 16-19, 2000, pp. 349-356 (XP002289926).

Volk M. et al., "Ontologies in Cross-Language Information Retrieval," online article at http://muchmore.dfki.de/pubs/w-onto-w.pdf retrieved Jul. 26, 2004, 10 pages (XP002289927).

Dongsong Zhang et al., "Enhancing Information Retrieval With Natural Language Processing Technology," Proceedings of the IASTED International Conference, Sep. 25-27, 2002, pp. 24-29 (XP009033854).

Natalya Noy and Deborah McGuinness, "Ontology Development 101: A Guie to Creating Your First Ontology," Stanford University, 25 pages (date unknown).

* cited by examiner

KEY TO FIGURES 5 THROUGH 12

⊗ = PREDICATE

⊘ = NON-PREDICATE LEXICAL TEXT ELEMENT

△ = CONTAINED GRAMMATICAL TEXT ELEMENT

→ = LEXICAL GOVERNMENT RELATIONSHIP

--→ = NON-LEXICAL GOVERNMENT RELATIONSHIP

↔ = COORDINATION RELATIONSHIP

☐ = COORDINATION MANAGER

COMPUTERIZED METHOD AND SYSTEM FOR SEARCHING FOR TEXT PASSAGES IN TEXT DOCUMENTS

CROSS REFERENCE TO RELATED APPLICATION

This application is based on and hereby claims the benefit under 35 U.S.C. §119 from European Application No. 02 028 856.9, filed on Dec. 23, 2002, in the European Patent Office, the contents of which are hereby incorporated by reference.

TECHNICAL FIELD

The present invention relates to methods for searching for text passages in text documents and, more specifically, to such methods that employ predication-based and ontology-based semantic language processing.

BACKGROUND

An important part of scientific research is the process of screening relevant literature. Due to the wealth of available information, however, screening literature is very time-consuming. Moreover, the volume of literature is constantly growing as new research results are published. For example, the study of protein-protein interactions, a key aspect of the field of proteomics, has gained a large amount of interest over the past decade. During a typical target validation phase of drug development, for example, scientists try to identify all of the interaction partners of a potential drug target in order to understand the effects and possible side effects of a proposed new drug. A search of Medline, the major public repository of scientific literature, for a single protein will typically return references to hundreds or thousands of documents. All of these documents must be screened in order to locate the desired information. If the query is refined in order to return fewer results, important documents can easily be overlooked.

As a further example, the future profitability of many businesses relies on decisions made today about where to invest for the future. One of the most important stages in such a decision-making process is the attempt to uncover existing intellectual property in a particular product space. Unfortunately, it is becoming more and more common for good products to fail to succeed because they infringe on existing intellectual property rights, resulting in wasted investment and derailed business strategies. The failure to succeed does not result from a lack of available information. For example, the U.S. Patent and Trademark Office allows free access to a full-text copy of every patent issued since 1976. Rather, the failure results from the need to analyze too much information. Analyzing each patent and patent application that contains a few select keywords is extremely laborious, and relevant references can easily be missed. Missing relevant references can be extremely costly in the long run.

In another example, businesses are interested in the activities of their competition. Information about which competitor is currently developing a particular product can be invaluable in making strategic decisions. Often, this information is present on publicly available information sources, such as data bases of research papers or patent applications. The key impediment to obtaining such information, however, is the difficulty in locating the relevant information within data bases that necessarily contain many millions of records. Making the best strategic decisions is not necessarily facilitated by having the most information, but rather by having the relevant information.

In the information age, a general lack of information is a less common problem than the inability to locate relevant information from an oversupply of data. In response to a query consisting of a few search terms, information retrieval systems aim to produce a list of documents that are usually ranked according to relevance. Such systems are usually quite unsophisticated and simply relying on returning documents that contain the search terms. Therefore, they normally produce poor results. They are unable to identify whether the meaning of a search term is the same as the meaning of a term used in a document. The inability to determine meaning can severely decrease the resulting precision, which is the ratio of the number of relevant results returned compared to the total number of results. Moreover, even simple linguistic relationships, such as the use of synonyms, abbreviations or more general terms, are often not taken into account. This causes many relevant results to be ignored and achieves only a modest recall, the ratio of the number of relevant results returned compared to the total number of relevant results available. Information retrieval systems commonly suffer from the problem that recall suffers when precision is improved, and vice versa.

Information extraction systems can obtain more accurate results than can be achieved through simple word matching by analyzing the text of a document. Some information extraction systems rely on an analysis technique called shallow parsing, in which words in a text passage are assigned to syntactic categories such as noun, verb, adjective and so on. This categorization is then used as the basis for a variety of statistical analyses. Information extraction systems using categorization and statistical analysis usually provide better results than do word-matching systems when judging whether or not a particular document is relevant. Nevertheless, the precision of such information extraction systems remains insufficient for most non-trivial applications. For example, such statistical systems are unable to distinguish between statements that assert that a particular fact is true and statements that assert the opposite, that the fact is not true.

Other information extraction systems rely on an analysis technique called deep parsing. Deep parsing involves a much more detailed analysis in which not only are the words in a sentence assigned to syntactic categories, but the relationships between the words are also identified. Nevertheless, information extraction using deep parsing has in the past yielded results not much better than those achievable using statistical methods.

An method is sought for searching for text passages in text documents that provides increased precision and that overcomes the limitations of existing analysis techniques.

SUMMARY

A computerized method for searching for text passages in text documents includes the steps of parsing the text documents to obtain syntactic text information about the text documents, processing the syntactic text information to obtain semantic text information about the text documents, building the semantic text information into first semantic text networks, and matching the first semantic text networks to second semantic text networks by specifying meanings of the text passages to find the text passages in the text documents.

The method can be used to find text passages that do not exactly match the wording of the text passages for which the search is being conducted. The method also finds text passages having the same meaning as the text passages that are to be located. Therefore, a user need not search a text document for different text passages with the same meaning. The method improves recall (coverage) while reducing the time needed for searching.

Semantic text information about the text documents being searched is structured into first semantic text networks and second semantic text networks. For example, each sentence of a text document being searched is built into a first semantic text network. A text passage that is to be located is built into a second semantic text network. The resulting first semantic text networks and the second semantic text networks have the same meta-structure so that they can be directly compared to each other. The syntactic text information may include surface-syntactic and deep-syntactic information. This information may be obtained from a deep parser, for example.

In order to improve the precision of search results the first semantic text networks and the second semantic text networks are linked to an ontology containing structured information about the domain of search or knowledge extraction. By using the ontology, the knowledge about the meaning of the text passages to be located can be improved. The ontology includes concepts. Each concept defines an entity and slots. For example, an entity defines a binary relation between two concepts. Other ontologies that include other elements may also be used.

In another implementation, knowledge is extracted from the text documents as a result of the step of matching. This knowledge is stored so that it later can be searched or located. The knowledge is extracted based on the structure of the ontology used for searching and knowledge extraction. Furthermore, the knowledge is derived from nodes of the first semantic text networks according to rules specified in association with the second semantic text networks.

The words of the text documents are classified into lexemes and grammatical text elements. In addition, the implementation determines the destination where the grammatical text elements are pointing, i.e., to a further grammatical text element or to a lexeme. A chain of grammatical text elements is constructed, wherein each grammatical text element, except for the last element, points to an additional grammatical text element. The last grammatical text element points to a lexeme. Compositions of lexemes and grammatical text elements are constructed, wherein a composition includes a lexeme, one or more grammatical text elements, and one or more chains of grammatical text elements. For example, a lexeme governs the grammatical text elements and chains of grammatical text elements that point to it.

The first semantic text networks are built such that words of the text documents form nodes. Links between the nodes capture grammatical relationships between the corresponding words. The words of the text passages to be located are built into the second semantic text networks. Coordinators form links between nodes of a one semantic text network. Additionally, coordinators form nodes that link corresponding coordinated nodes to another node.

In another embodiment, a computer program executes a method for searching for text passages in text documents as described above.

In yet another embodiment, a computerized system for searching for text passages in text documents includes means for parsing text documents to obtain syntactic text information about the text documents, means for processing the syntactic text information to obtain semantic text information about the text documents and for building the semantic text information into first semantic text networks, and means for matching the first semantic text networks to second semantic text networks and for specifying meanings of the text passages to find the text passages in the text documents.

In yet another embodiment, a computer-readable medium includes program instructions for searching for text passages in text documents by performing the steps of parsing, processing, building and matching. Text documents are parsed to obtain syntactic text information about the text documents. The syntactic text information is processed to obtain semantic text information about the text documents. The semantic text information is built into first semantic text networks. The first semantic text networks are then matched to second semantic text networks by specifying meanings of the text passages to find the text passages in the text documents.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate implementations and embodiments of the invention.

DETAILED DESCRIPTION

Reference will now be made in detail to some embodiments of the invention, examples of which are illustrated in the accompanying drawings.

Figure 1:
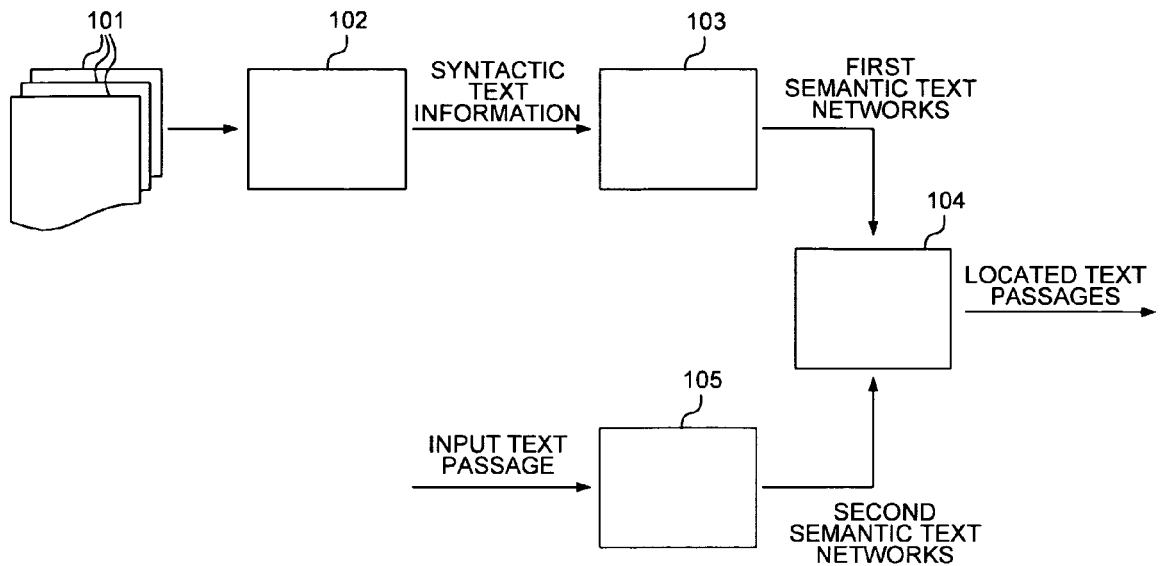
FIG. 1 is a block diagram of one embodiment of a system for searching for text passages in text documents according to the invention.

FIG. 1 shows one embodiment of a system for searching for text passages in text documents according to the invention. Text documents 101 are input into a parser 102 for parsing said text documents. The parser 102 provides syntactic text information, which may be surface-syntactic and deep-syntactic information about the text documents, to a means 103 for processing said syntactic text information and for building first semantic networks. A matching means 104 matches the first semantic text networks to second semantic text networks, which specify the meaning of text passages to be located (input text passages). As a result of said matching, the matching means 104 provides at its output located or matched text passages and/or locations thereof in the text documents. The text passages to be located may be defined by a user and input into a means for building a second semantic text network 105. They then may be built into second semantic text networks having the same meta structure as the first semantic text networks, so that the matching means 104 is able directly to compare these semantic text networks with each other.

Figure 2:
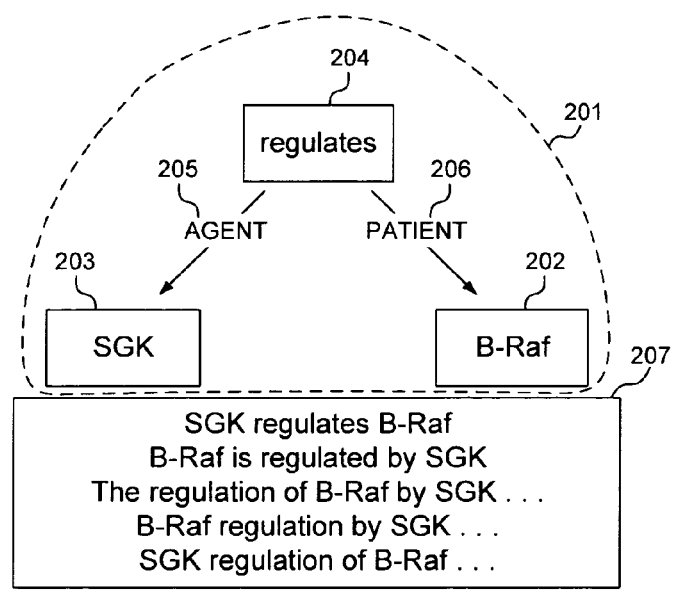
FIG. 2 shows search results for an exemplary text passage to be located.

FIG. 2 shows an example of a second semantic text network 201 representing the meaning of a text passage to be located: "SGK regulates B-Raf". The words in blocks 202-204 constitute nodes of the second semantic network, and the arrows represent links, i.e., grammatical relations between the corresponding words. The label "AGENT" of the link 205 reflects the role of SGK as an agent of the word "regulates". The label "PATIENT" of the link 206 reflects the role of "B-Raf" as being the patient of the word "regulates".

In box 207 there are listed some text passages located in text documents through matching the second semantic text network 201 with first semantic text networks representing text passages in text documents. FIG. 2 shows that not only the exact wording of "SGK regulates B-Raf" is located or matched, but also text passages in text documents that include not only different positions of the single words in the text passages, but also different forms of the word "regulates".

Figure 3:
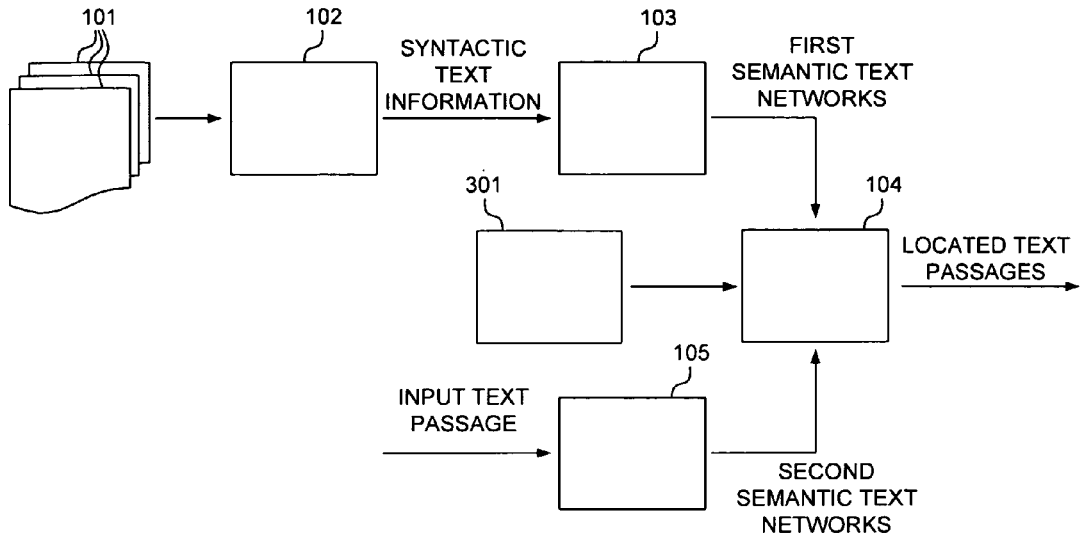
FIG. 3 is a block diagram of another embodiment of a system for searching for text passages in text documents according to the invention.

FIG. 3 shows another embodiment of a system for searching for text passages in text documents wherein, additionally to the system of FIG. 1, an ontology 301 is linked to the matching means 104 in order to be linked to first and/or second semantic text networks.

Figure 4:
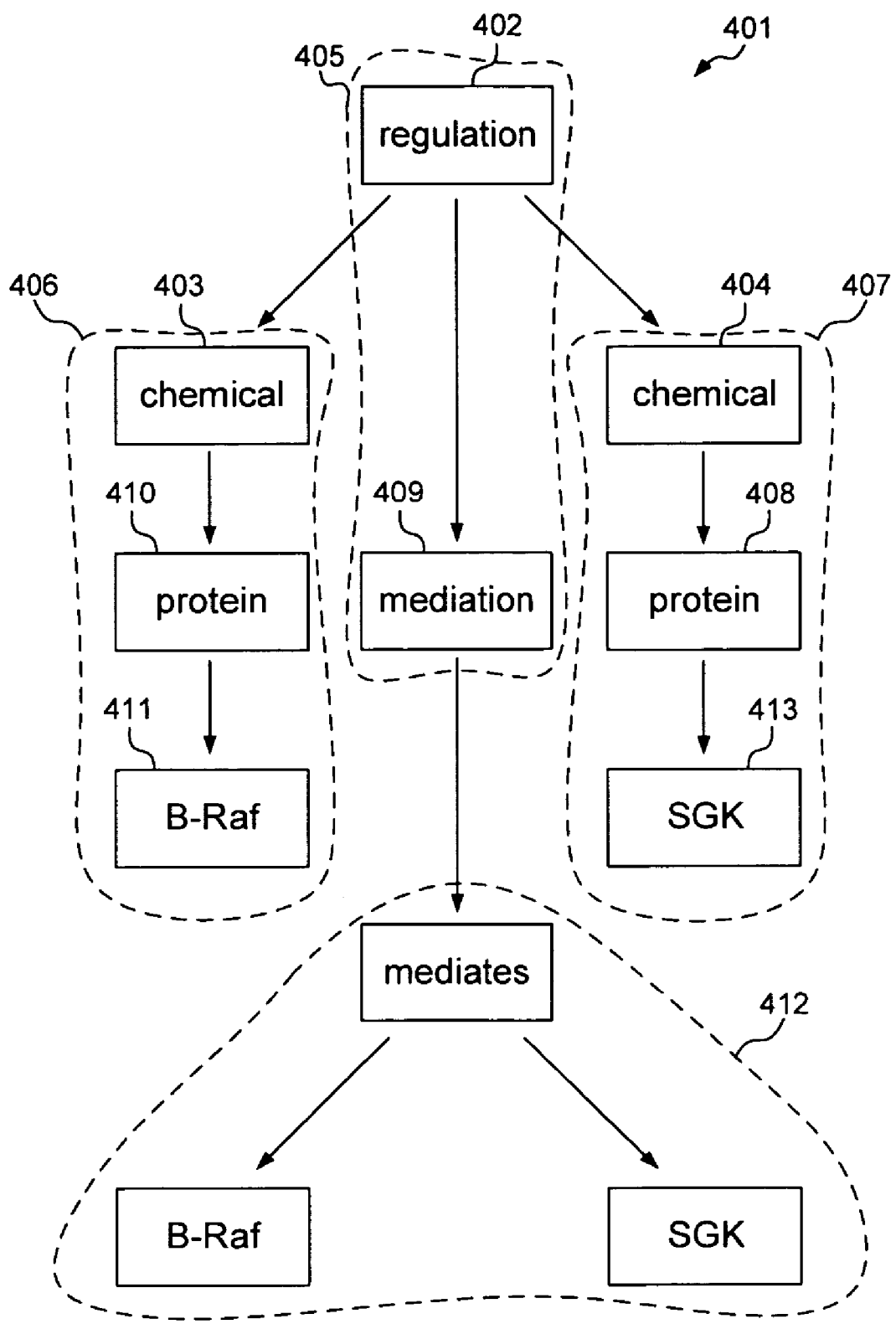
FIG. 4 is a diagram illustrating the relationships between a text passage to be located and a text passage in a text document.

FIG. 4 shows an example of linking concepts of an ontology to the first and second semantic networks for a given text passage to be located, which is: "a chemical regulates a chemical". The second semantic text network 401 comprises nodes 402-404 and corresponding links between them. The word "regulates" is replaced by the word "regulation" in the node 404. This is illustrated below with reference to another example shown in FIG. 9.

Each of the nodes 402-404 represents concepts in an ontology. By linking the second semantic text network 401 to an ontology the following additional information may be obtained: the ontology structure 406 shows the concept "chemical" 403 having a hyponym concept "protein" 410, which in turn has a hyponym concept "B-Raf" 411. The same applies to the ontology structure 407, wherein in contrast to the ontology structure 406 the hyponym concept "SGK" 413 is a hyponym of the concept "protein" 408. Furthermore, the ontology structure 405 shows the concept "regulation" 402 having a hyponym concept "mediation" 409. Using the information of the ontology as shown, the text passage 412 "B-Raf mediates SGK" from a text document is matched or located.

Figure 15:
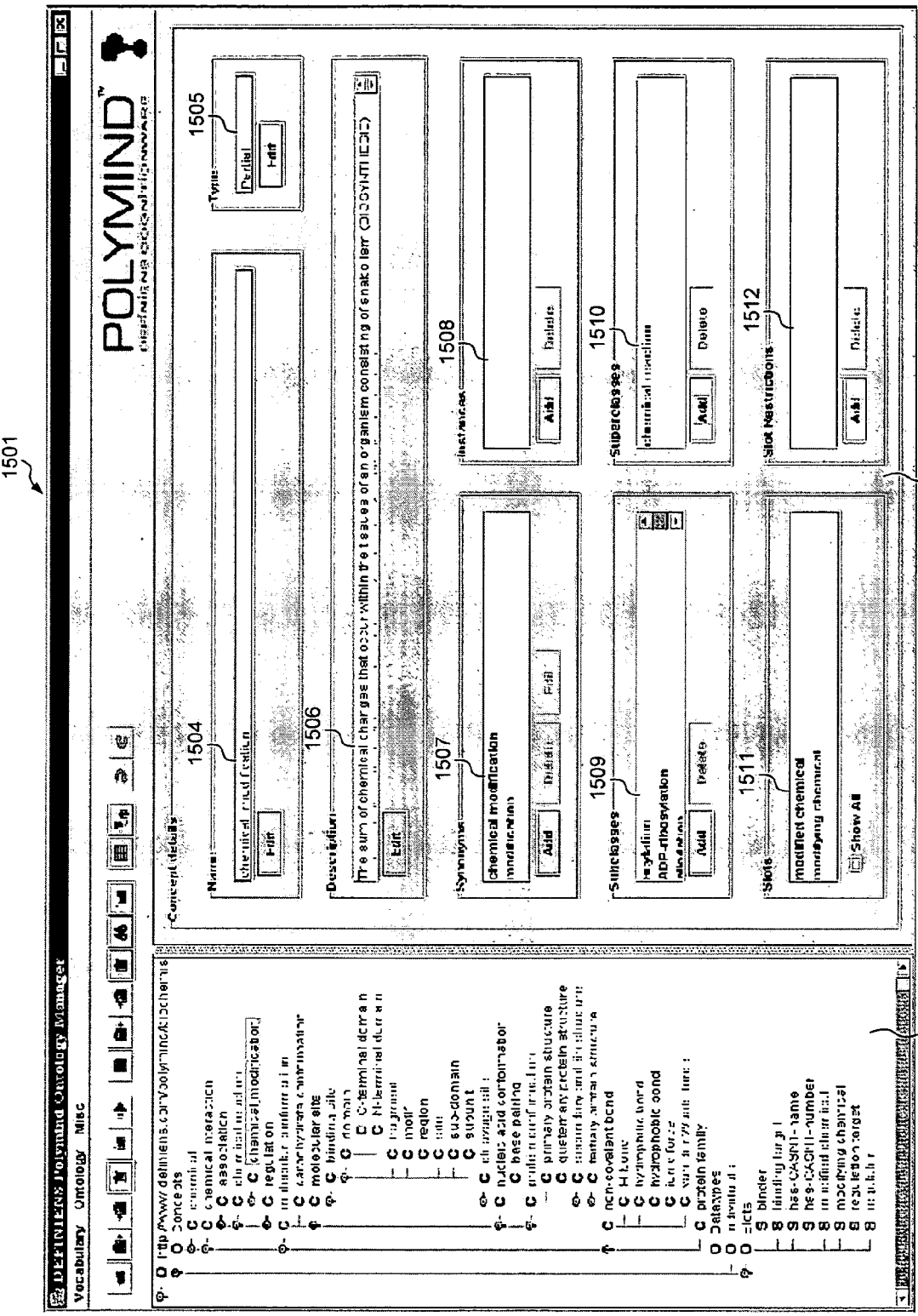
FIG. 15 is a screen shot of an ontology editor.

Now with reference to FIG. 15, which shows a screen shot of an exemplary ontology editor, a description of the basics of an ontology is given. The ontology editor 1501 can be used, for example. A new empty ontology can simply be created, and concepts can be added using the ontology editor 1501, for example. This allows complete control over the content of the ontology and is useful for creating small ontologies. However, when creating large ontologies, which may contain many thousands of concepts, this approach is usually impractical. A further possibility for creating an ontology is to load in an existing vocabulary and export it to the ontology format. This approach allows ontologies containing large numbers of concepts to be easily generated. However, this does not provide complete control over the content, by a user. This can lead to a decrease in the quality of the ontology, which in turn can affect the precision of extracted information. It may, therefore, be necessary to edit such ontologies after they have been generated.

Figure 8:
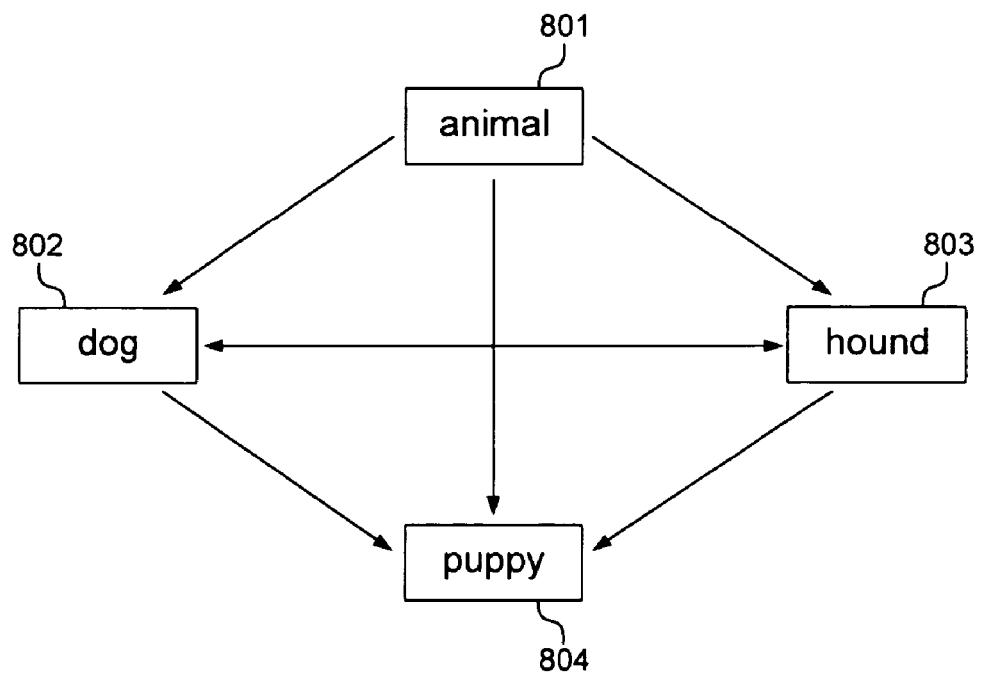
FIG. 8 is a block diagram showing the relationships between hypernyms, synonyms and hyponyms.

An ontology contains definitions of the terminology in a particular domain. One of the fundamental elements of an ontology is a concept which defines things, whether these are concrete entities like cars or abstract entities like ideas. Concepts are usually arranged in a hierarchy that specifies the subclasses (hyponyms) and superclasses (hypernyms) for concepts. For example, as shown in FIG. 8, the concept "dog" 802 might have a concept "animal" 801 as a superclass, a concept "hound" 803 as a synonym, and a concept "puppy" 804 as a subclass. The most general concept, the root of the concept hierarchy, is usually the only concept that does not have at least one superclass. By extension of the tree analogy, a concept that does not have any subclasses is referred to as a leaf. The immediate superclasses of a concept are called its parents and all of the more general concepts above a concept, up to and including the root concept, are its ancestors. Similarly, the immediate subclasses of a concept are called its children and all of the more specialized concepts below it in the hierarchy are called its descendants.

Another of the basic units in an ontology are called slots. A slot is a binary relation which has a domain and a range. The domain is a concept, and the range is either a concept or a data type. Where the range is a concept, the slot is known as a relationship. An example of a relationship is the slot "eats" with the domains set to the concept "animal" and the range set to the concept "living-thing" which simply expresses the notion that "animals eat living things".

The other kind of slot is a property, which have as the range a data type such as integer, string or date. Properties allow the values of attributes to be associated with concepts. For example, there is defined a property slot called "age" whose domain is the concept "animal" and whose range is the data type "integer".

Concepts inherit both kinds of slot from their superclasses. For example, the concept "human" would inherit the slot "has-parent" from its superclass "animal".

Slots can also be arranged in a hierarchy, for example, the relationships "has-mother" and "has-father" are subslots of the relationship "has-parent". Slots have the same domain concept or one of its subclasses, as the superslot. Subslots of relationships have the same range concept, or one of its subclasses, as the superslot. Subslots of properties have the same data type or a subtype of it, as range data type.

A so-called individual is an instance of a concept. Individuals are commonly things that exist in the world, e.g., the dog "Rover" is an instance of the concept "dog". It is sometimes possible to enumerate the instances of a concept, e.g., specifying the twelve instances of the concept "month".

Slots can have associated cardinalities, which specify the number of such relationships or property values an individual can or must be involved in. A cardinality may be exact, a minimum, or a maximum (specifying an exact cardinality is the same as specifying minimum and maximum cardinalities with the same value). The default minimum cardinality is zero and the default maximum cardinality is unbounded (i.e., no limit applies), for example. As an example, the slot "has-parents" would have the exact cardinality of two and the slot "has-mother" would have the exact cardinality of one.

As shown in FIG. 15, the ontology manager or editor 1501 on the left side shows a tree representation 1503 of an ontology. There are listed in hierarchical order concepts, data types, individuals, and slots with respective subclasses. On the right side of the ontology editor 1501 there are shown concept details 1502. They include the name of the concept 1504, a description 1506, a list of synonyms 1507, a list of instances 1508, a list of subclasses 1509, a list of superclasses 1510, a list of slots 1511, and slot restrictions 1512.

Inherited slots can be restricted in various ways by the inheriting concept. For example, if "human" inherits the property slot "number-of-limbs" it is possible to specify that the value for "human" is always 4. This is done using slot restrictions 512 which are an important means of making definitions in an ontology.

A slot can be restricted in various ways. First, a "range restriction" specifies that the range of a slot for a concept is restricted to a particular subclass (for relationship) or subtype (for properties) of the range concept or data type. As an example of a relationship range restriction, consider that when the concept "human" inherits the slot "has-parents" the range of this slot may be restricted to "human", as humans can only have other humans as parents.

Second, a "slot filler" specifies that a slot has a particular value where that value is either an individual or concept (for a relationship) or a data value (for a property). For example, a slot filler with the concept "lion" can be associated with the relationship "eats" and specify that it has the concept "antelope" as a value.

Third, a cardinality restriction specifies either a cardinality that applies only to a slot for some concept and its descendants, or that is a more restricted form of an existing cardinality. For example, if there is a slot "has-siblings" associated with the concept "human" the cardinality of this slot can be restricted to zero for the concept "only-child".

Fourth, a qualified cardinality restriction is the same as a cardinality restriction with the exception that the slot restriction specifies a range that the restricted cardinality applies to.

These slot restrictions may constitute one of the main ways in which definitions of concepts are given. The usual process is to define a concept as a subclass of another concept and then add slot restrictions which specify how the subclass differs from its superclass.

Furthermore, the type or definition of the concept 1505 may be selected in the ontology editor 1501. Concept definitions are either partial or complete (the default may be partial). A partial definition for a concept (also called a primitive concept) is a set of necessary conditions which all instances of the concept must satisfy. A complete definition for a concept (also called a defined concept) is a set of necessary and sufficient conditions which all instances of the concept must satisfy and which are sufficient to identify individuals as instances of the concept. For example, there could be given a partial definition of the concept "animal" by saying that it is a subclass of the concept "living-thing". This definition states that all animals are living things, but not all living things are animals. As an example of a complete definition, there can be said that the definition for the concept "carnivore" is a kind of animal that eats other animals. If this definition is marked as complete, it asserts both that any animal that eats other animals is a carnivore and that all carnivores eat other animals. Complete definitions are generally preferable in ontological definitions since they allow more inferences to be made and make an ontology easier to validate, but they are not always possible.

It is normal practice to arrange all of the information concerning a concept, slot or individual into a single organizational structure called a frame. For a concept, this will include a text description, its name, synonyms, slots and their associated cardinalities, for example.

Figure 13:
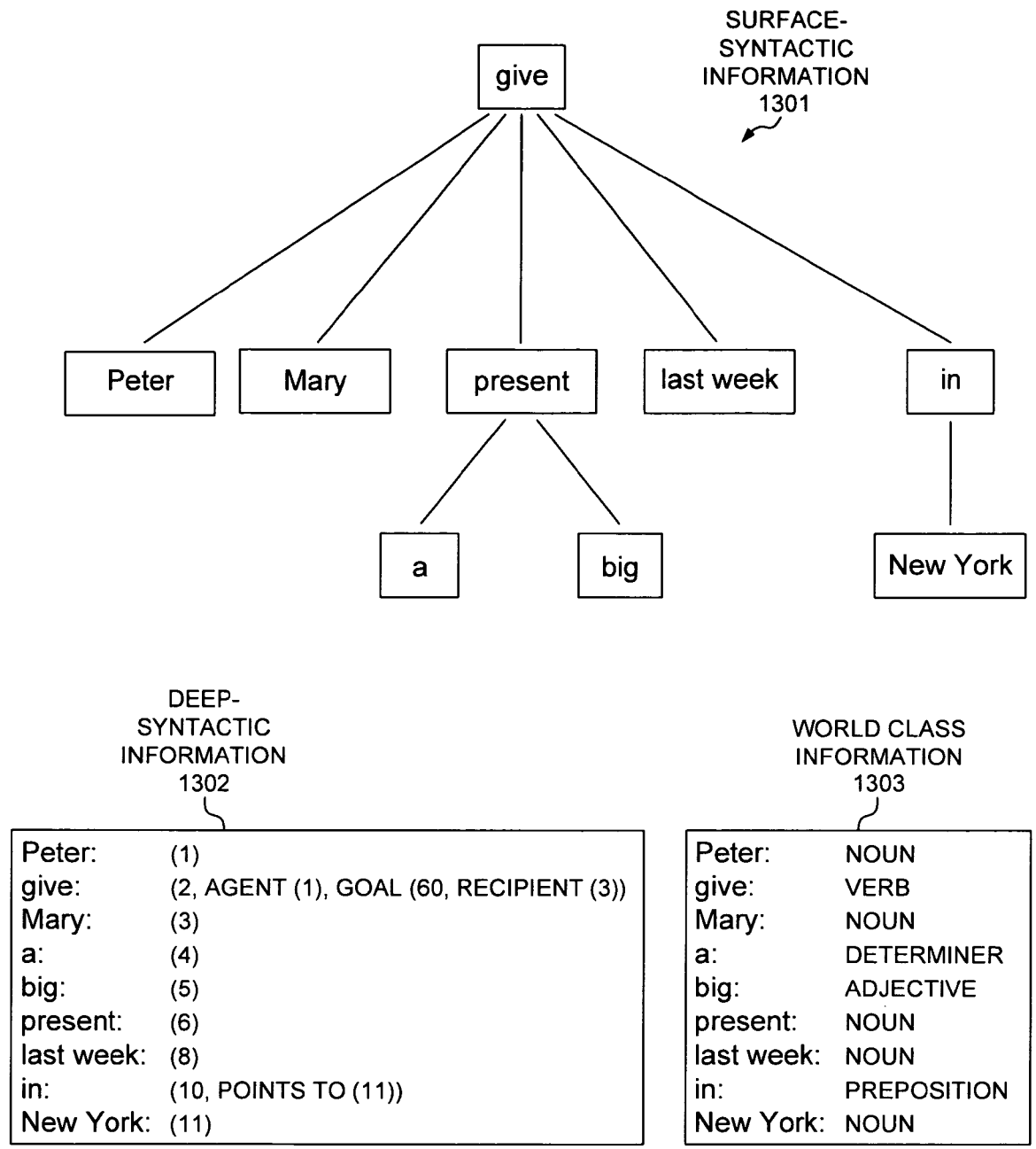
FIG. 13 is a diagram of surface-syntactic information and deep-syntactic information for a given sentence.

FIG. 13 shows an example of syntactic text information of a text passage "Peter gave Mary a big present last week in New York" of a text document 101, which may be obtained by the parser 102. There are shown three kinds of syntactic information, i.e., surface-syntactic information represented by a tree 1301, deep-syntactic information 1302 given for the single words of the text passage, and word class information 1303, also given for each word of the text passage. The tree of surface-syntactic information shows that the word "give", which is a verb as shown in the word class information 1303, is on the top level. On the level below are the words "Peter", "Mary", "present", "last week" and "in", each having a link to "give". The bottom level includes the words "a" and "big", each having a link to the word present, and "New York" having a link to "in". The deep-syntactic information 1302 of each word indicates in the corresponding parentheses at first the position of the word in the text passage, which is for "Peter", for example, 1. Further deep-syntactic information is given for the word "give", in that it points to the word at position 1, whose role is to be "agent" of "give", to the word at position 6, whose role is to be of a "goal" of "give", and to the word at position 3, whose role is to be a "recipient" of "give". The deep-syntactic information for the word "in" indicates that "in" points to the word at position 11 which is "New York".

Figure 14:
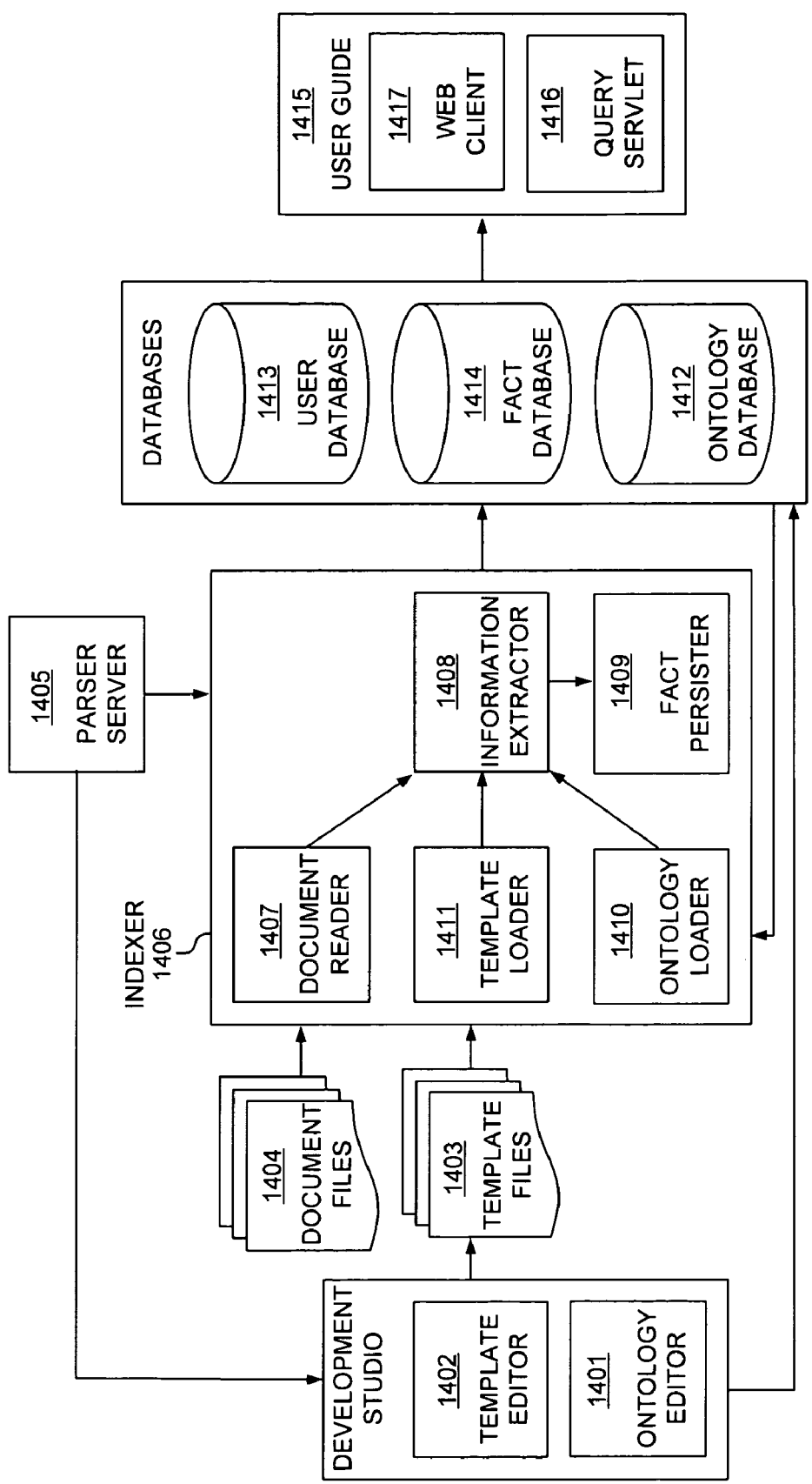
FIG. 14 is a block diagram of a system for knowledge extraction according to yet another embodiment of the present invention.

There may be further information given by the parser 102, which may be used for obtaining semantic text information and/or for building the first semantic text networks. Thus, FIG. 14 shows only a possible example of syntactic information to be used to obtain semantic text information.

Figure 5:
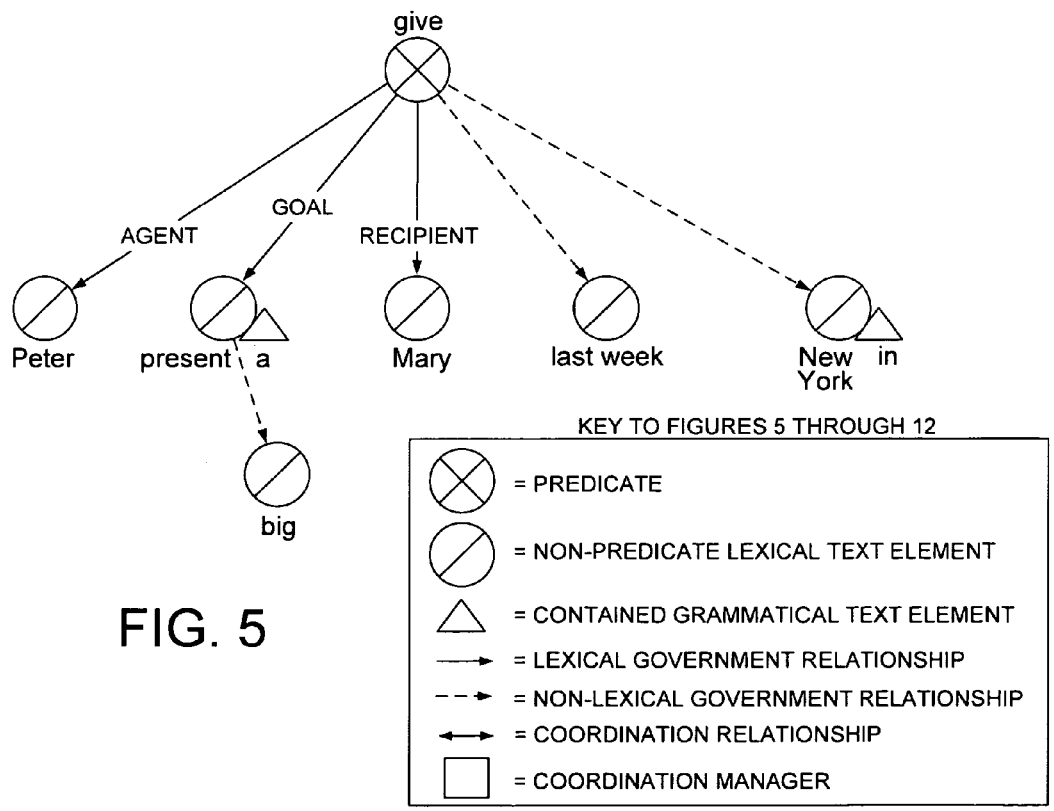
FIG. 5 is a diagram of a first semantic text network for a given text passage in a text document.

In the following there is explained an example of how to build a first semantic network with reference to FIGS. 5 and 6. FIG. 5 shows an example of a first semantic network representing the text passage "Peter gave Mary a big present last week in New York".

A sentence, for example, always contains one or more words with semantic reference (scope), or independent meaning in some word (henceforth lexemes—examples are dog, girl, thought, big, it), and typically contains words with no semantic reference (henceforth grammatical text elements— examples are the, and, by, ought) which modify the semantic reference of individual lexemes or express relationships between multiple lexemes.

Lexemes usually have direct translations in other languages. Information carried by grammatical text elements in one language is in another language frequently incorporated into the morphology of lexemes, expressed by word order, or completely absent.

Specific instances of grammatical text elements can only be understood with respect to specific instances of lexemes so that every grammatical text element in a sentence may preferably be associated with one or more lexemes. Therefore, there may be modeled compositions (relationships), as will be explained later with reference to FIG. 6, with the lexemes as the containing objects, which serves to hide the grammatical text elements at a structural level whilst retaining their information.

In classifying words in a sentence, any element which is not classified as any grammatical text element type is by default a lexeme, for example. By means of this any governed grammatical text element may be replaced with its associated lexeme(s) during the semantic network building process.

Therefore, in this example, the text passage or sentence is divided into lexemes and grammatical text elements. Here, "a" and "in" are classified as grammatical text elements, and the remaining words "Peter", "give", "Mary", "big", "present", "last week", and "New York" are classified as lexemes. A grammatical text element is represented as a triangle in FIG. 5. Here, the grammatical text element is added to its associated lexeme, wherein lexemes are shown as circles. Thus, the grammatical text element "a" is combined with its lexeme "present", and the grammatical text element "in" is combined with its lexeme "New York". The circles or lexemes represent nodes of the first semantic text network. Instead of combining a grammatical text element with its associated lexeme, it would also be possible to represent them by separate nodes having a link to the corresponding lexeme.

Figure 6:
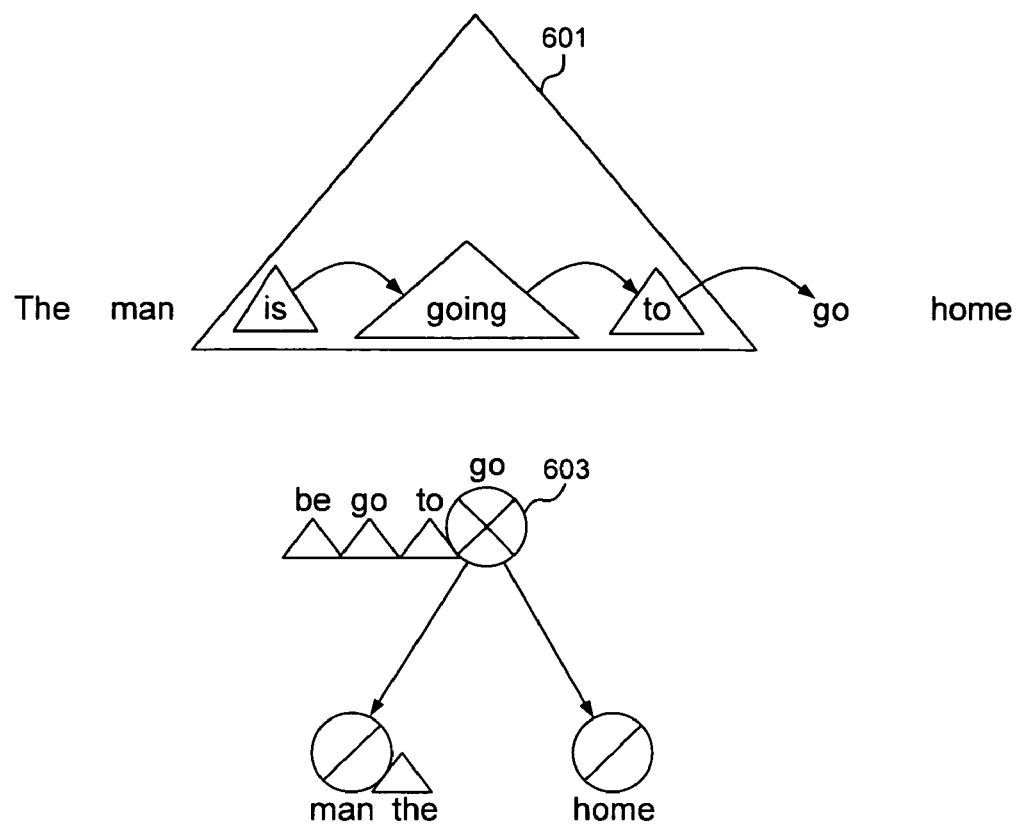
FIG. 6 is a diagram of a chain of grammatical text elements pointing to a lexeme and the representation thereof in a first semantic network.

Furthermore, as can be seen from FIG. 6, multiple grammatical text elements may be combined with each other building a chain of grammatical text elements 601. At first, it is determined to which word(s) or text element(s) the grammatical text element points. If the text element(s) are lexeme(s), there is a direct composition relationship where the lexeme(s) contain the grammatical text element that points to them. If, on the other hand, the text element(s) are grammatical text element(s), the grammatical text element that points to them is treated as though it pointed directly to whatever text element they themselves point to. In the example shown in FIG. 6 the grammatical text element "is" points to the grammatical text element "going", which in turn points to the grammatical text element "to". These three grammatical text elements build a chain of grammatical text elements 601. The last of the chain of grammatical text elements "to" points to the lexeme "go". Therefore, the chain of grammatical text elements 601 itself also points to the lexeme "go". The corresponding first semantic text network 602 shows that the chain of grammatical text elements 601 is combined with the lexeme "go" 603, building a composition relationship. Of course, as explained with reference to FIG. 5, it is possible to represent the chain of grammatical text elements 601 as at least separate node having a link to the lexeme or node 603.

Each lexeme can thus be seen as ending a chain of no, one or many grammatical text elements. The text element chains, being the means for determining which grammatical text elements each lexeme contains, provide an elegant means for replacing any governed grammatical text element with its associated lexeme(s) during the semantic network building process.

Referring again to FIG. 5, the lexemes are further subdivided into predicates and non-predicates. The only predicate shown in the example of FIG. 5 is the word or lexeme "give". Furthermore, there are shown relationships between the predicate "give" and its arguments "Peter", "present", and "Mary". These relationships which each are shown by a solid lined arrow are called lexical government relationships. The corresponding roles of the lexical governed arguments, as explained with reference to FIG. 13, are shown at the corresponding arrows.

A second relationship between the predicate "give" and the other lexemes "last week" and "New York" which, in this example, are non-predicates, is shown by dashed lined arrows. The lexemes "last week" and "New York" constrain the reference or scope of the lexeme "give". Such lexemes are called satellites and the corresponding relationship between the satellites and the constrained lexeme "give" is called a non-lexical government relationship. The same applies to the satellite "big" being non-lexically governed by the lexeme "present".

Note that the text passage "Peter gave Mary a big present in New York last week" would be represented by the same first semantic text network of FIG. 5. In contrary, the text passage "Mary gave Peter a big present last week in New York" would have changed roles of "Peter" and "Mary".

Lexical government relationships are generally determined from deep-syntactic information, and non-lexical government relationships from the surface-syntactic information tree.

In non-lexical government the governing object cannot place restrictions upon the characteristics of elements which are allowed to act as its satellites and if it has more than one satellite they are not ordered with respect to one another. In lexical government, on the other hand, the governing object can require certain attributes of its arguments, e.g., the giver governed by the predicate "give" cannot be an abstract noun except in metaphorical usage. Furthermore, swapping arguments around, as in the latter text passage, very definitely changes the meaning of the predication (semantic). For example, whilst satellites of a lexeme are best modeled as a set, then, arguments of a predication are preferably as a minimum requirement modeled in a way that captures their inherent order. The precision of semantic network structure matching can be increased by additionally labeling a predicate's arguments to reflect their semantic roles, as e.g., "Peter" might be labeled the "agent" etc.

Figure 7A:
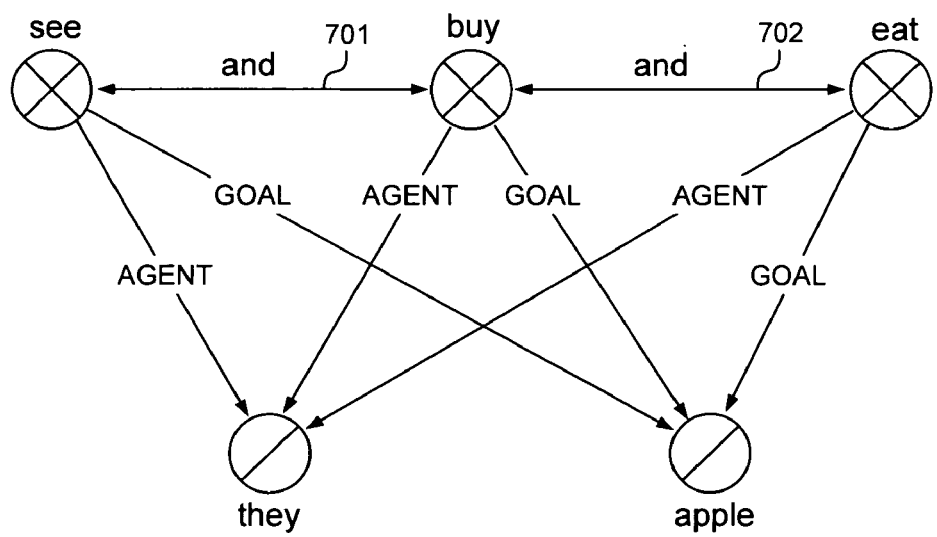
FIGS. 7A through 7C show a first semantic text network, including various coordination structures.
Figure 7B:
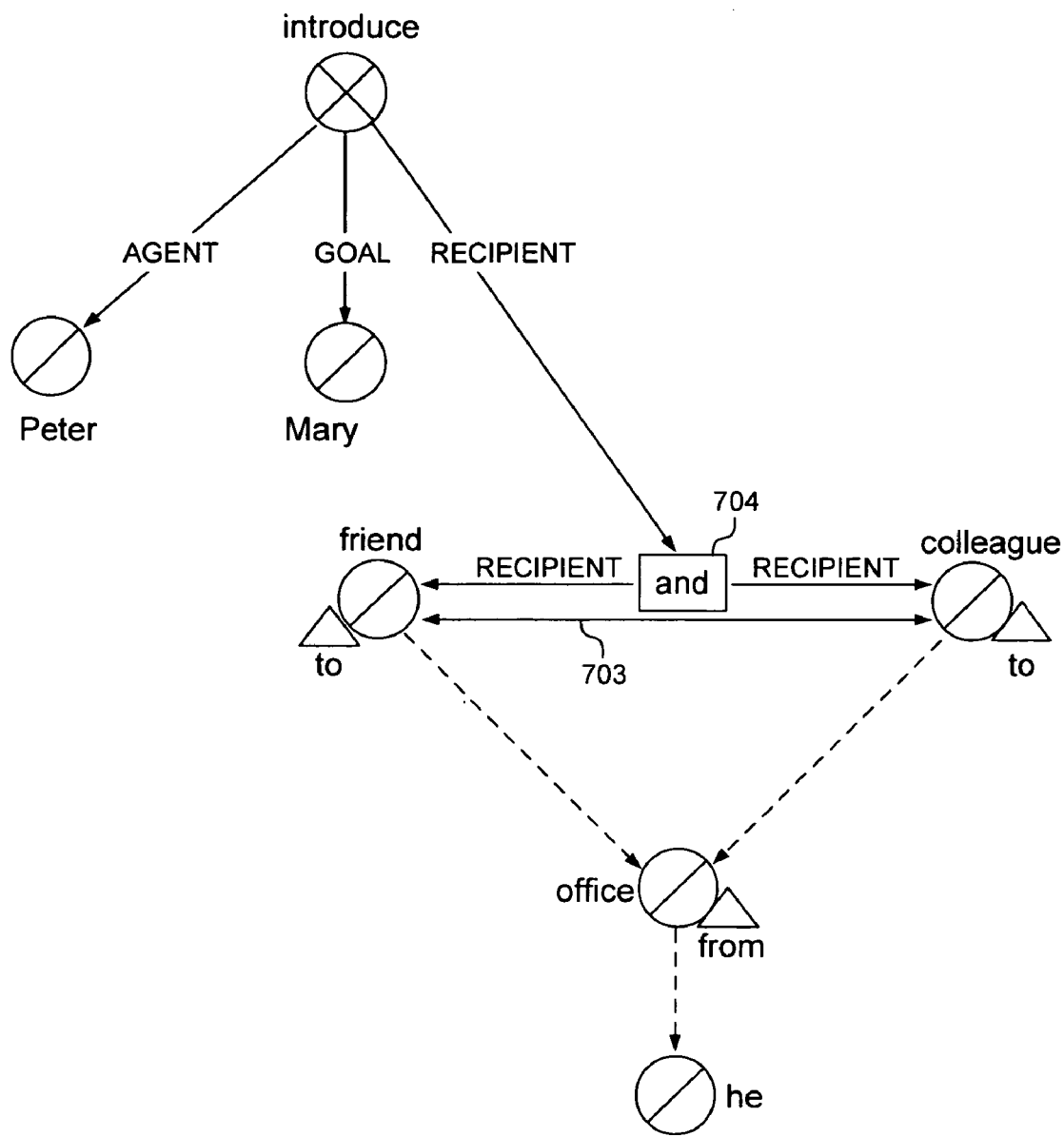
Figure 7C:
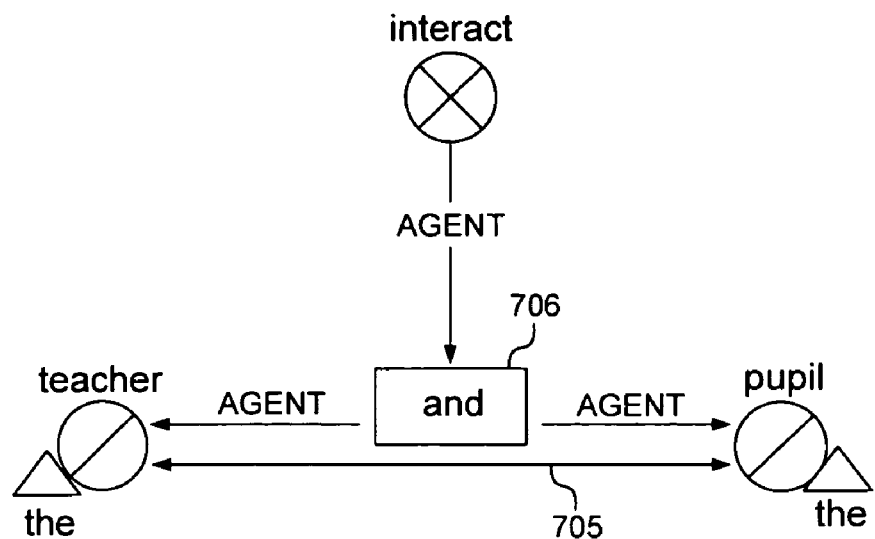

FIGS. 7A-7C show examples for handling the grammatical text element "and" being a coordinator. Coordination allows a (lexical or non-lexical) government relationship to have more than one governing and/or governed participant. Where there are multiple governing participants it is always possible to remodel such a relationship in terms of multiple one-to-one relationships as long as the coordinated elements maintain information about each other to capture the meaning of the coordinator itself (e.g., "and" versus "or"). The following sentence (1), therefore, may be transformed into the sentence (2):

(1) They saw, bought and ate apples.

(2) They saw apples and bought apples and ate apples.

The corresponding first semantic text network is shown in FIG. 7A. The coordinators 701, 702 between the predicates "see" and "buy" and between "buy" and "eat" are shown as double-headed arrows representing so called coordination relationships.

The semantic network structure built from sentence (3) is shown in FIG. 7B:

(3) Peter introduced Mary to friends and colleagues from his office.

In this example, the predicate "introduce" points to the lexically governed recipients "friend" and "colleague". The coordination relationship between the lexemes "friend" and "colleague" is shown by a double-headed arrow 703 as explained with reference to FIG. 7A. Furthermore, in the example of FIG. 7B a so called "coordination manager" 704 may be used to manage the relationship of "friend" and "colleague". Thus, the predicate "introduce" points to the coordination manager 704 instead of directly pointing to "friend" as well as to "colleague".

Additionally, here the non-predicate "office" is non-lexically governed by two non-predicates, i.e., "friend" and "colleague".

It is theoretically possible to avoid the need for a coordination manager when representing sentence (3) as a semantic network structure by remodeling the sentence as shown in sentence (4).

(4) Peter introduced Mary to friends from his office and introduced Mary to colleagues from his office.

However, a similar approach as shown with reference to the sentences (3)-(4) to multiple governed participants is not always feasible, because a predicate can impose select ional restrictions on an argument requiring the totality of the elements making it up to be plural. For example, the sentence (5) can not be remodeled as sentence (6).

(5) The teacher and the pupil interacted.
(6) The teacher interacted and the pupil interacted.

This example is shown in FIG. 7C. Here, again the coordination relationship between the arguments "teacher" and "pupil" of the predicate "interact" is represented by a double-headed arrow. Furthermore, there is also needed a coordination manager 706 for managing the relationship between "interact" and "teacher" and "pupil". Therefore, coordinators are modeled as grammatical text elements which may point to up to two text elements.

The deep-syntactic information outputted by the parser 102 for a given text passage does not always map completely to the relevant parts of the desired semantic network structure: there are some circumstances in which a predicate-argument relationship does not appear in the deep-syntactic information. Because semantic analysis is not the primary aim of a syntactic parser, it is very likely that this will also be the case for other languages than English and other parsers. Therefore, rules may be written which contain whatever features (surface-syntactic, deep-syntactic and/or lexical) are diagnostic for the relevant problem structures as well as instructions to correct the associated deep-syntactic information. This structure identification could be achieved automatically. The rules may be developed by hand. The sort of structures they cover include, for example:

a) relative clauses, e.g., "the situation as obtaining", "the first person to see him", where the parser does not recognize a predicate-argument relationship between a verb and a preceding noun linked together other than by a relator;

b) subordinate clauses, e.g., "it is good for him to shout", "he did it in order to be seen", "he did it by shouting", where the parser does not recognize a predicate-argument relationship between a verb and an argument of a preceding predicate that is linked to the verb by a subordinator;

c) incorporated phrases, e.g., "government-funded project", "skin-eating virus", where the parser does not recognize predicate-argument relationships between an adjective and an incorporated noun and sometimes between the same adjective and the noun it describes; and d) nominal predicates, e.g., "the chasing of a dog by a dog", where the parser does not recognize predicate-argument relationships between pairs of nouns.

It is also possible to apply statistical or other techniques to resolve pronouns (e.g., he, she, it) to their referents elsewhere in the text.

Figure 16:
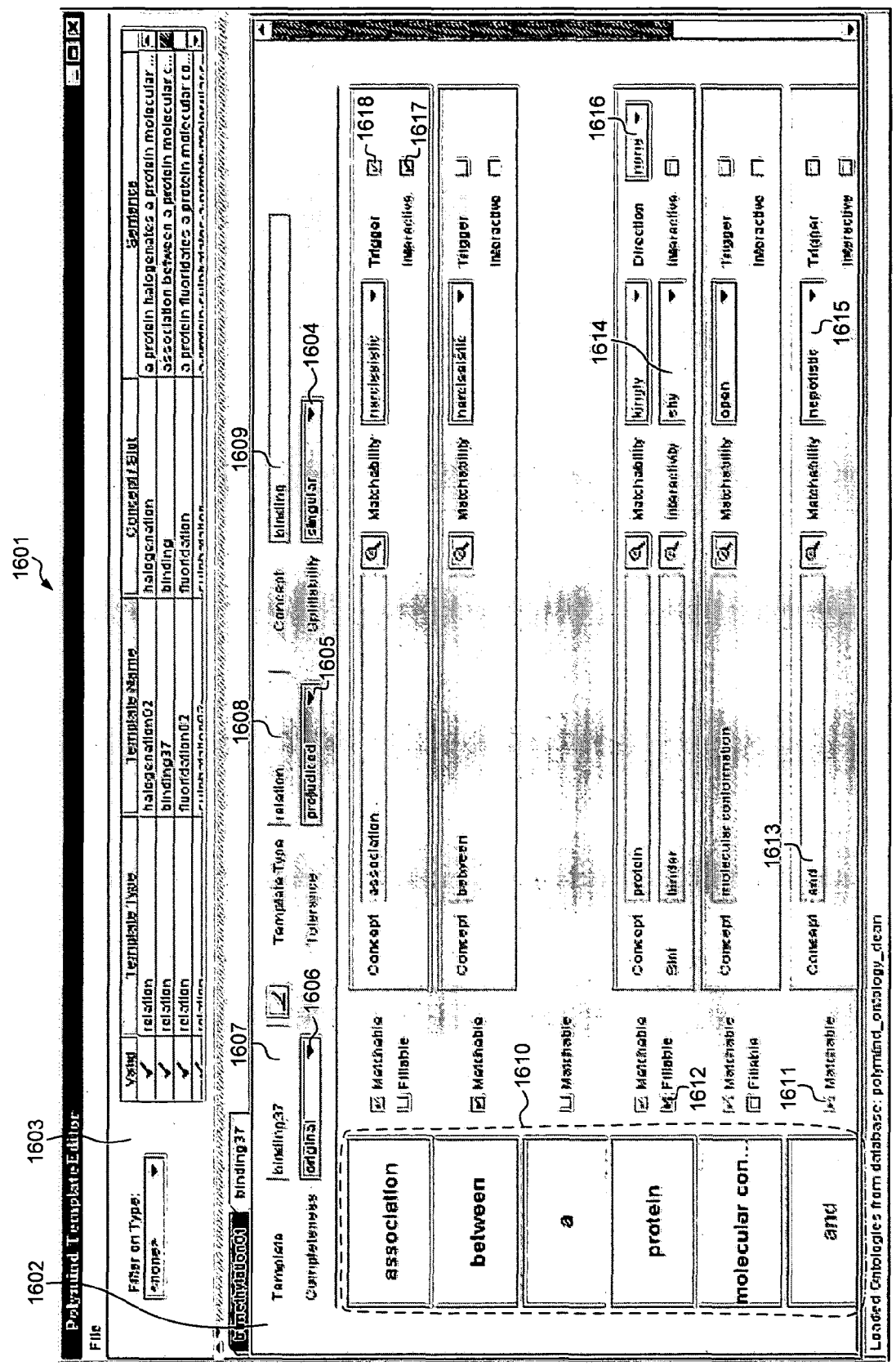
FIG. 16 is a screen shot of a template editor.

Now, with reference to FIGS. 9 through 12 and 16, the second semantic networks or templates are explained. Second semantic text networks which specify the meaning of text passages to be located may be developed using a template editor as shown in FIG. 16, wherein a text passage to be located may be represented by a corresponding template. The template editor 1601 of FIG. 16 shows an upper part 1603 with listings of templates including a template type, template name, concept or slot and a sentence or text passage to be located or to be used for knowledge extraction. The text passage to be located "association between a protein molecular conformation and . . . " is shown at 1610. The lower part 1602 shows further details of the template named "binding 37" shown at 1607. At 1608 the template type is shown, in this example "relation". The so-called "relation template" constitutes the main template or fundamental template to be used to search for text passages (input text) and to extract in text documents knowledge therefrom. Other types of template are, for example, only applied to input text that has already matched a relation template and serve to determine certain attributes of the result.

Figure 9:
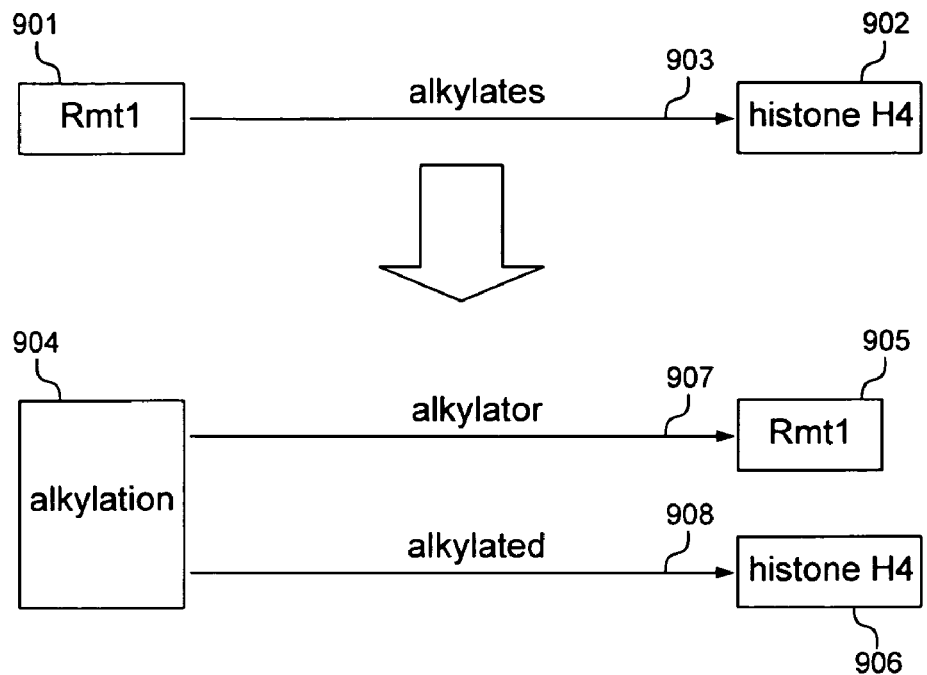
FIG. 9 is a diagram of the representation of a relationship slot by two other relationship slots.
Figure 10:
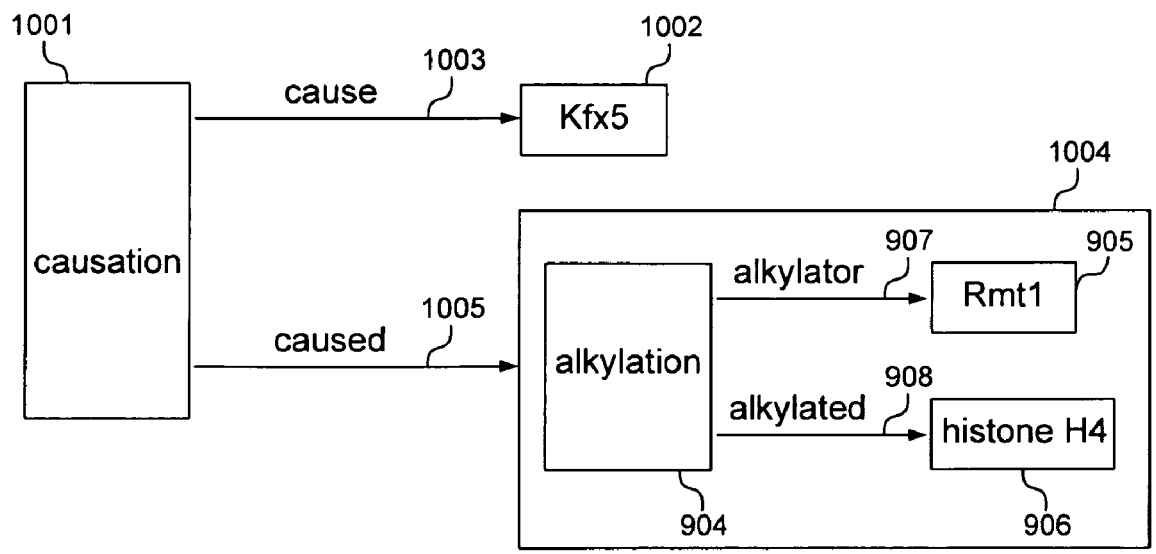
FIG. 10 is a diagram of a relation template interacting with another relation template.

As explained above, a relationship between two concepts may be represented by a relationship slot. The fact that "Rmt1 alcylates histone H4" could, therefore, be represented by a relationship slot "alcylates" with "Rmt1" as its range and "histone H4" as its domain. This simple depiction is fine as long as there are only two participants in a relationship, but offers no way of expressing a relationship between three or more participants. In order to cater for ternary and higher relationships, the relationship itself may be expressed as a concept. This relationship concept may then be linked to the concept it relates by a new set of relationship slots representing the roles the related concepts play in the relationship. FIG. 9 shows an example of this procedure, which is called reification. The relationship slot "alcylate" 903 has a domain "Rmt1" 901 and a range "histone H4" 902. The relationship slot 903 is then linked to the corresponding concept "alcylation" 904 which is a domain of the new relationship slot "alcylator" 907 and of the new relationship slot "alcylated" 908. The former domain "Rmt1" 901 constitutes the range 905 of the relationship slot 907. Furthermore, the former range "histone H4" 902 now constitutes the range 906 of the relationship slot "alcylated" 908. The new set of relationship slots may be found in a linked ontology.

There may be determined rules for matching the first semantic text networks and the second semantic text networks. Some of them, for example relate to word-level matching. That means that words in text passages to be located (words in templates) are matched with single words in text documents using information from the ontology, for example. An input text matches a template phrase if the truth of the input text implies the truth of the template phrase, for example. Taking the example shown in FIG. 8, anything said about "dogs" that is true for all "dogs" will also be true for all "hounds" and for all "puppies". It can be generalized that a word of an input text matches a template word if the word of the input text is the same word, a synonym or a hyponym of the template word.

For individual words within a template, this matching procedure can be restricted so that, for example, a template word does not match words of input text that are the same word or synonyms but only that are hyponyms, or conversely that it does not match words of input text that are hyponyms but only that are the same word or synonyms. This may be specified using the "matchability option" 1614. There may be different "matchability options":

Narcissistic: a matching word of a text passage (input text) must be a form of the same word as the template word, or the two words must form a corresponding verb-noun pair (e.g., phosphorylate: phoshporylation).

Nepotistic: a matching word of a text passage must be a synonym of the ontology frame associated with the template word.

Kingly: a matching word of a text passage must be a hyponym of the ontology frame associated with the template word.

Open: the requirements for either nepotistic or kingly must be fulfilled.

Those words in a template phrase or passage that require the presence of corresponding words in a matching text passage are called "matchable words". Preferably lexemes and coordinators are always matchable, and grammatical text elements are optionally matchable. In the template editor 1601 the matchable words are indicated by a mark at "matchable" 1601. Furthermore, a matchable word must, for example, identify the ontology frame which should be used as the basis for matching words of text passages. In FIG. 16, for example, the matchable word "and" 1611 identifies the concept frame "and" 1613.

Preferably, the linguistic and ontology sides of templates are completely decoupled, meaning that it is possible to specify an ontology frame that does not correspond to the word itself. This is useful where a frame name consists of more than one word, e.g., "negative regulation", and this frame name is not recognized as a multiword. In this case there may be chosen just "regulation" as the word to which this frame name is to correspond. It may be permitted for a matchable word to declare two, rather than one, ontology frames in a situation where the short name of one frame is the base form of a noun that is derived from a verb that is the short name of the other frame (e.g., "phosporylation" is formed from "phosphorylate"). The members of such a pair of words may mean the same, however, it is conceivable that an ontology (probably one based on a dictionary) would include them as separate ontology frames, both of which might then need to be taken into account when matching words of text passages.

One or more words in the template may be associated with ontology relationship slots. Such words are called "fillable words" 1612. In a fact extracted using the template, for example, the relationship slot associated with a fillable word will link the fact relationship concept to the ontology concept corresponding to the word of the text passage that matched the fillable word. In the template "a protein alcylates a protein", for example, the two instances of "protein" would be declared fillable and would be associated with "alcylator" and "alcylated", respectively, as explained with reference to FIG. 9. A fillable word 1612 preferably is a lexeme which may means that it is also matchable.

In the upper version of the two representations in FIG. 9 the relationship slot "alcylate" 903 is directed: The relationship is directed from the domain 901 to the range 902. This direction, which is shown by the arrow in the diagram, is inherent to the semantics of the verb "alcylate": One entity performs an action on another entity.

In the lower (reified) version of FIG. 9 the direction is no longer present in the structures themselves, but is expressed by the real-world meanings of the relationship slot frames "alcylator" 907 and "alcylated" 908. This presents a problem for any user interface wishing to depict the whole fact, which will not have access to these real-world meanings, for example.

For this reason, a fillable word 1612 may specify along with its relationship slot a direction 1616 which represents the nature of the association between the relationship concept and any related concepts that will be matched to the fillable word 1612.

There are some situations in which it makes sense for templates to work together. For example, it may be wished to extract information corresponding to a hypothetical template "a protein causes a protein to alcylate a protein" in addition to an existing template "a protein alcylates a protein". Writing the new template as it stands would certainly work, but it would extract a considerable amount of information in common with the old template.

A preferable solution, which is called "interactivity", is to add a new template "a protein causes _l to alcylate" with "protein" and "alcylate" as fillable words, and to somehow associate the concept extracted at this new fillable word "alcylate" with the whole fact extracted by the old template. Supposing that "interact" is a superclass of "alcylate", the new template could be defined as "a protein causes _l to interact" or even "a protein causes _l to _l" which will also work for any pre-existing templates extracting information about other protein relationships. _l is a so-called wild card which will be explained later.

The interactivity is represented in FIG. 16 by the "interactivity attribute" 614 of fillable words and the "interactive attribute" 617 of matchable words. If a single word or a text passage matches a fillable word of template X with suitable interactivity and a matchable word of template Y that is declared interactive, the ontology slot associated with the fillable word from template X will, in the fact extracted by template X, link template X's relationship concept to the whole fact extracted by template Y rather than merely to the concept corresponding to the word of the text passage. An example thereof is given in FIG. 10. The concept "causation" 1001 is the domain of a first relationship slot "cause" 1003 and a second relationship slot "caused" 1005. Accordingly, the range of the relationship slot 1003 is "Kfx5" 1002, wherein the range of the relationship slot 1005 is represented by another template 1004 consisting of a concept "alcylation" 904 as domain of the template slots "alcylator" 907 and "alcylated" 908 with range "Rmt1" 905 and "histone H4" 906, respectively.

There are, for example, three possible interactivity options:

Shy: The ontology slot declared by this fillable word will always link the relationship concept to the related concept corresponding to the word of the text passage matching this fillable word. Other templates matching overlapping text passage structures are completely ignored.

Friendly: If the word of the text passage matching this fillable word also matches a matchable word of a second template which is declared interactive, the ontology slot declared by this fillable word will link the relationship concept to the fact structure extracted by the second template. If this is not the case, the ontology slot declared by this fillable word will link the relationship concept to the related concept corresponding to the word of the text passage matching this fillable word.

Clinging: If the word of the text passage matching this fillable word also matches a matchable word of a second template which is declared interactive, the ontology slot declared by this fillable word will link the relationship concept to the fact structure extracted by the second template. If this is not the case, no fact is extracted.

As mentioned above, there is the possibility to use so-called wildcards in template definition. A lexeme wild card _l matches any lexeme in an input text structure. A predicate wildcard _p matches any lexeme in an input text structure that is a predicate, i.e., whose reference is obligatorily constrained by another lexeme in the structure.

For between 10 percent and 20 percent of sentences, there is built a semantic structure the validity of which is unsure. Such a semantic structure is referred to as "incomplete". There may be generated statistics about sentences for which no semantic structures could be built (between 0.1% and 0.5% of sentences) and sentences for which incomplete structures were built. Whether or not an incomplete text passage structure may match a template can be specified as the template's "completeness" 1606. The completeness option may have different values, which are for example:

unspecified: Incomplete text passage structures are allowed to match this template;

original: Incomplete text passage structures are ignored by this template; complete text passage structures containing words originating from incomplete text passage structures are allowed to match this template; or complete: Both incomplete text passage structures and complete text passage structures containing words originating from incomplete text passage structures are ignored by this template.

English, for example, is characterized by compound phrases formed by nouns formed from verbs and nouns dependent on these nouns, e.g., "information extraction", "inspector examination". This is called "incorporation". In most cases, the first noun in the phrase acts as the subject (e.g., "student travel"="travel by students") or the object (e.g., "information extraction"="extraction of information" of the second, verbal noun in the phrase.

Sometimes it is not clear whether the subjective or objective usage is intended. For example, does "soldier interrogation" mean "interrogation by soldiers" or "interrogation of soldiers"? No information can be extracted from such ambiguous incorporated phrases. Where the semantics of the second noun or the context only allow one or other usage, however, an incorporated phrase can be treated as equivalent to its non-incorporated counterparts. These normally include both noun phrases ("travel by students", "extraction of information") and verb phrases ("student travel", "information is extracted").

The problem here is that in many incorporated phrases the first noun has a function that is neither subjective nor objective, e.g., "computer production by the Koreans" probably means "production of computers by the Koreans", but could also be read as meaning "production by the Koreans using computers". If a template developer judges for a given template that the risk of information being wrongly extracted from incorporated phrases misinterpreted as matching the template outweighs the benefit of information extracted from correctly interpreted incorporated phrases, he, for example, may specify that all incorporated phrases be ignored when matching the template. This attribute is called the template's "tolerance" 1605. The tolerance 1605 may have different values that are, for example:

prejudiced: Text passage structure incorporated noun structures may not be used in matching this template; or tolerant: Text passage structure incorporated noun structures may be used in using this template.

Taking a hypothetical template based on the phrase "a protein associates with a protein" and a hypothetical input sentence "ELF associates with Smad3 and Smad4", it will be appreciated that there are two different ways the information in the text could be represented as facts, for example. The system could either extract a single fact or two related ontology concepts "Smad3" and "Smad4" linked to the relationship ontology concept by the ontology slot associated with the second "protein" in the template; or it could extract two facts, as if it had encountered two separate sentences "ELF associates with Smad3" and "ELF associates with Smad4". Which of these two courses of action to take can be specified as a relation template's "splittability" 1604. The first representation corresponds to splittability "plural", the second to splittability "singular".

Further rules for matching first and second semantic text networks relate to phrase level matching. This means that text passages are matched to templates according to underlying meaning rather than according to surface form. For a phrase or passage within a sentence of a text document to match a template, for example, the following conditions must be fulfilled:

1) the text passage must have the same semantic structure as the template, and/or 2) the nodes in the text passage structure (first semantic text network) must represent words that are of the same type as their counterparts in the template structure (second semantic text network), and/or 3) the words associated with each corresponding pair of nodes from the two structures must match at the word level as explained above, and/or 4) each link in the first semantic text network must be of the same type as its counterpart in the second semantic text network.

In matching a text passage with a template passage one word at a time is matched, for example. Having ascertained that a given word of a text passage matches a template word at the word level, it may be looked whether the two words are of the same type and/or whether the word of the text passage has links corresponding to the links connected to the template word. Then the word at the end of each of these links in the two structures (networks) may be considered and the process may be repeated. If the whole template structure has been traversed and the text passage has matched it everywhere, a valid match is found, for example.

This process may start with a single pair of words matching at the word level. Thus, exactly one matchable word in each template definition is selected as a "trigger word" 1618, for example. Correspondingly, the text passage is searched at the word level for words which match "trigger words" 1618 of templates. The set of words that potentially match a given "trigger word" 1618 normally include synonyms or hyponyms as well as the "trigger word" 1618 itself, and any grammatical form of each potentially matching word may be valid. When a word of a text passage is located that matches a trigger word, the matching process described above can begin.

There are different ways in which the system can be configured to search for words of text passages matching trigger words. In a more simple setup, a semantic network structure is generated for each sentence, and each of the words in each semantic network structure is examined to see whether it matches trigger words of any templates in the system. A more complex setup which is called "trigger word preselection", is designed to reduce the overhead of semantic network structure generation. Here the raw text form of each sentence is located strings which look like grammatical forms of words matching trigger words. For sentences containing such strings, semantic network structures are then generated and analyzed in the normal way; sentences in which nothing is found may be totally ignored. Using trigger word preselection nearly always results in various significant speed gains over not using it.

In the following, there will be described two further kinds of templates with reference to FIGS. 11 and 12. The first relates to so-called "slot templates" which allow extra information to be extracted about concepts extracted at fillable words. Supposed there are templates such as "a protein associates a protein", "a protein alcylates a protein", "a protein binds a protein". By means of slot templates, it is possible to know whenever any of the proteins in text documents matching these templates are described as "phosphorylated" or "activated". There are concepts in the ontology "phosphorylated" and "activated" which are both hyponyms of a general concept "modified", for example.

It is possible to add templates such as "a modified protein associates a protein", "a protein associates a modified protein", "a modified protein associates a modified protein", and so on, but this approach quickly leads to a massive proliferation of templates and to the extraction of a large amount of duplicate information. A much more wieldy solution would be to use a slot template which captures the structure "a modified protein" and abstracts it away from individual relation templates, for example.

A slot template has an ontology slot as an attribute, for example; it also may declare one of its matchable words, which may not be the trigger word, as its "slot word". The slot template's ontology slot contains the ontology concept corresponding to the slot templates trigger word in its domain and the ontology concept corresponding to the slot template's slot word in its range, for example.

Figure 11:
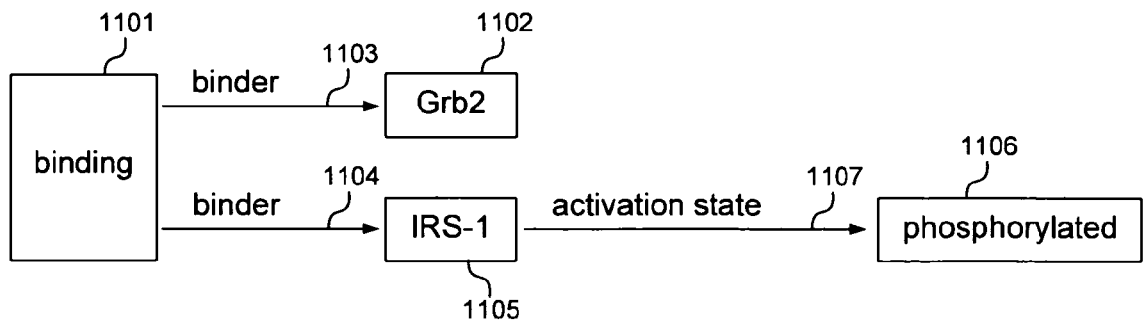
FIG. 11 is a diagram of a relation template further using a slot template.

FIG. 11 shows a corresponding block diagram of the text passage "phosphorylated IRS-1 associates Grb2 . . . ". There are two relation slots "binder" 1103 and 1104 having "binding" 1101 in its domain. The range of the first relation slot 1103 is "Grb2" 1102. However, the range "IRS-1" 1105 of the second relation slot "binder" 1104 further constitutes the domain of a slot "activation state" 1107 having the attribute "phosphorylated" 1106 in its range.

The second kind of templates is a context template which aims to index a fact according to the words and phrases surrounding the text from which it is extracted, for example. A context template extracts a single ontology concept which is stored as a context of any fact extracted from a text passage structure in the scope of a text passage structure matching the context template's predication structure. There may be no limit on the number of ontology concepts that may be stored as contexts of a given fact. The most simple type of scope is where the text passage structure matching a context template is in the same sentence as the text passage structure from which the fact was extracted. There are various other more complex types of scope. For example, if the sentence preceding and the sentence following a sentence from which a fact was extracted both contain text passage structures matching context templates, and the two ontology concepts these context templates extract stand in a direct hierarchical relationship, the more general ontology concept will be extracted as a context of the fact.

Figure 12:
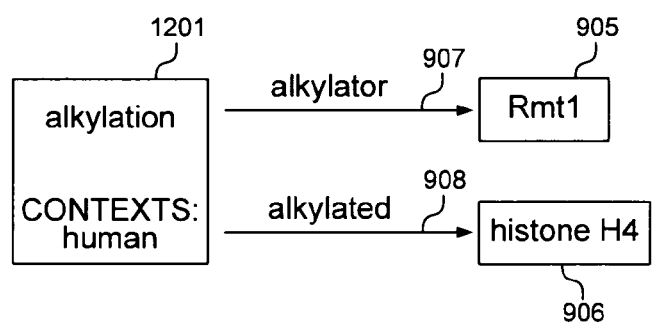
FIG. 12 is a diagram of a relation template used in combination with a context word.

FIG. 12 shows an example of a corresponding block diagram of a context template in combination with a relation template, wherein the text passage to be located is "a protein alcylates a protein", the context to be located is "human", and the located text passage is "Rmt1 alcylated histone H4 in humans . . . ". The structure is similar to that of FIG. 9, the difference being that the domain concept "alcylation" 1201 additionally includes the context "human".

Rather than specifying an ontology concept explicitly, a generic context template may be used which designates one word in the template predication structure as its "seed word". The ontology concept the template extracts from a given text passage structure is the ontology concept associated with the word of the text passage matching the seed word. In the example shown in FIG. 12, a seed word may be "organism" instead of "human" (being a hyponym of "organism").

A text passage matching a template phrase may be tested to see if it has a negative status. That means that it is checked if the text passage contains negative satellites such as "not" and "neither", negative arguments such as "nobody", "none", "nothing", negative determiners such as "no" and negator verbs such as "fail", for example. This relates to a case where the negative elements are not contained in the template phrase itself.

Furthermore, the same the modality status of a text passage which has matched a relation template may be determined.

This is achieved using modality templates which preferably contain the predicate wildcard "_p". Examples of modality templates are "may _p" and "it seems that _p". Where a modality template matches a text passage and the text passage predicate matching the predicate wildcard "_p" in the modality template is also contained within a text passage matching a relation template, the fact extracted using the relation template may have the modality "possible". Modality "possible" may also be discerned in situations where the modality template predicate wildcard and a predicate within a relation template match two different text passage predicates that are related within a semantic network structure according to predefined rules.

Furthermore, there may be provided a possibility to match multiwords of a text passage. There are considered three kinds of words, for example:

"head word" in a text passage of a text document as, for example, "cat";

"small multiword", which is built around a "head word" by adding corresponding one or more satellites and possibly recursively the satellites of these satellites, for example, as in "big cat"; and "large multiword", which is built around a head word adding a corresponding satellite and preceding verbal phrases as in "stressed big cat".

When matching a word of a text passage to a template word, the following may be tried as text passage input words in the following order:

a) the complete "large multiword";

b) the "large multiword" minus its initial word, then minus its initial word and its second word, and so on;

c) the complete "small multiword";

d) the complete "small multiword" minus its initial word, then minus its initial word and its second word, and so on; and e) the "head word" only.

FIG. 14 shows a further embodiment of the invention which is used for knowledge extraction and querying the extracted knowledge (facts). In the template editor 1402 there are developed templates. The corresponding template files 1403 are loaded by a template loader 1411 into an indexer 1406. By means of an ontology editor 1401 ontologies are developed and stored in a ontology data base 1412. Document files 1404 are read by a document reader 1407 into the indexer 1406. Furthermore, an ontology loader 1410 loads ontologies from the ontology data base 1412 into the indexer 1406. The template editor 1402 and the indexer 1406 call a parser server 1405. An information extractor 1408 performs steps according to the invention, i.e., parsing the text in the document files to obtain syntactic text information about the text documents, processing the syntactic text information to obtain semantic text information about the text documents, and building first semantic text networks thereof, and matching the first semantic text networks to second semantic text networks defined by the template files 1403 preferably using ontologies loaded by the ontology loader 1410 to extract information or knowledge or facts from the text in the document files. A fact persister 1409 stores the facts in a fact data base 1414. By means of a query servlet 1416 and a web client 1417 a user may query the facts stored in the data base 1414. In the user data base 1413 information about the rights for the access to the fact data base etc. are stored, for example.

Figure 19:
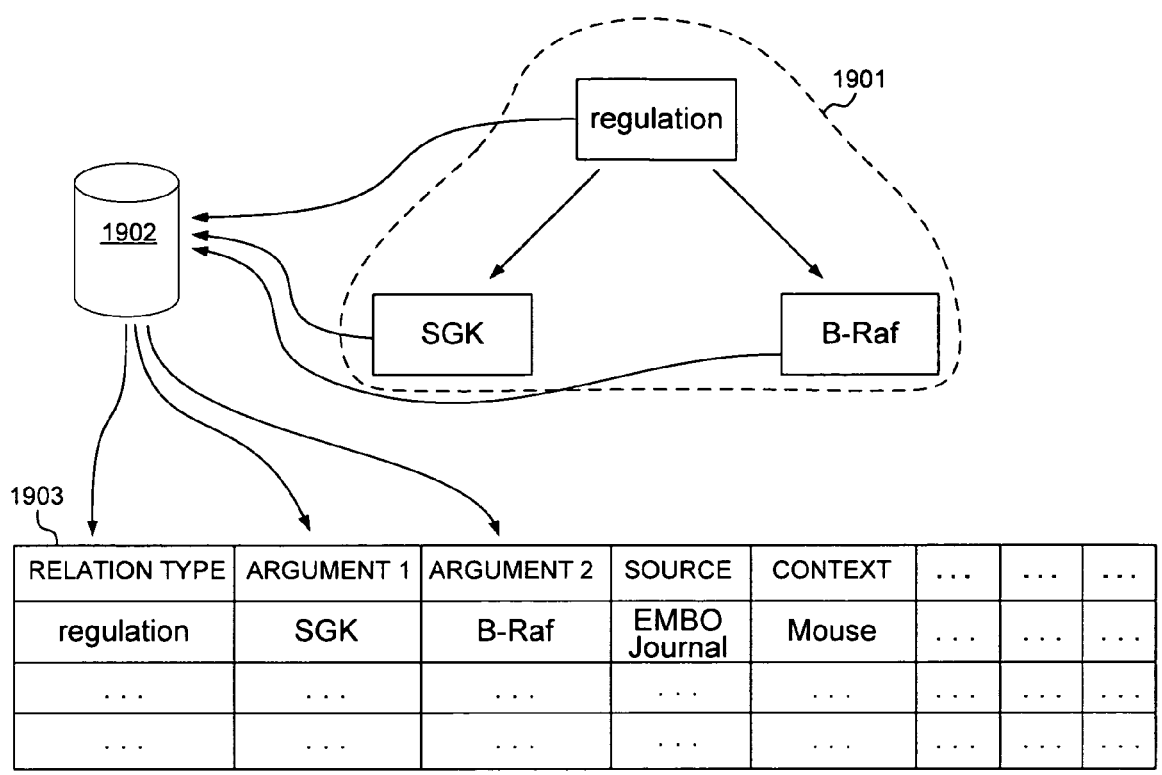
FIG. 19 is an illustration of extracted knowledge linked to an ontology.

The extracted facts may be structured in accordance with a corresponding ontology as shown in FIG. 19. The extracted fact 1901 "SGK regulation BRaf" is linked to the ontology 1902, stored in the ontology data base 1412, for example. The map 1903 shows how the knowledge information may be stored in a relational fact data base.

Figure 17:
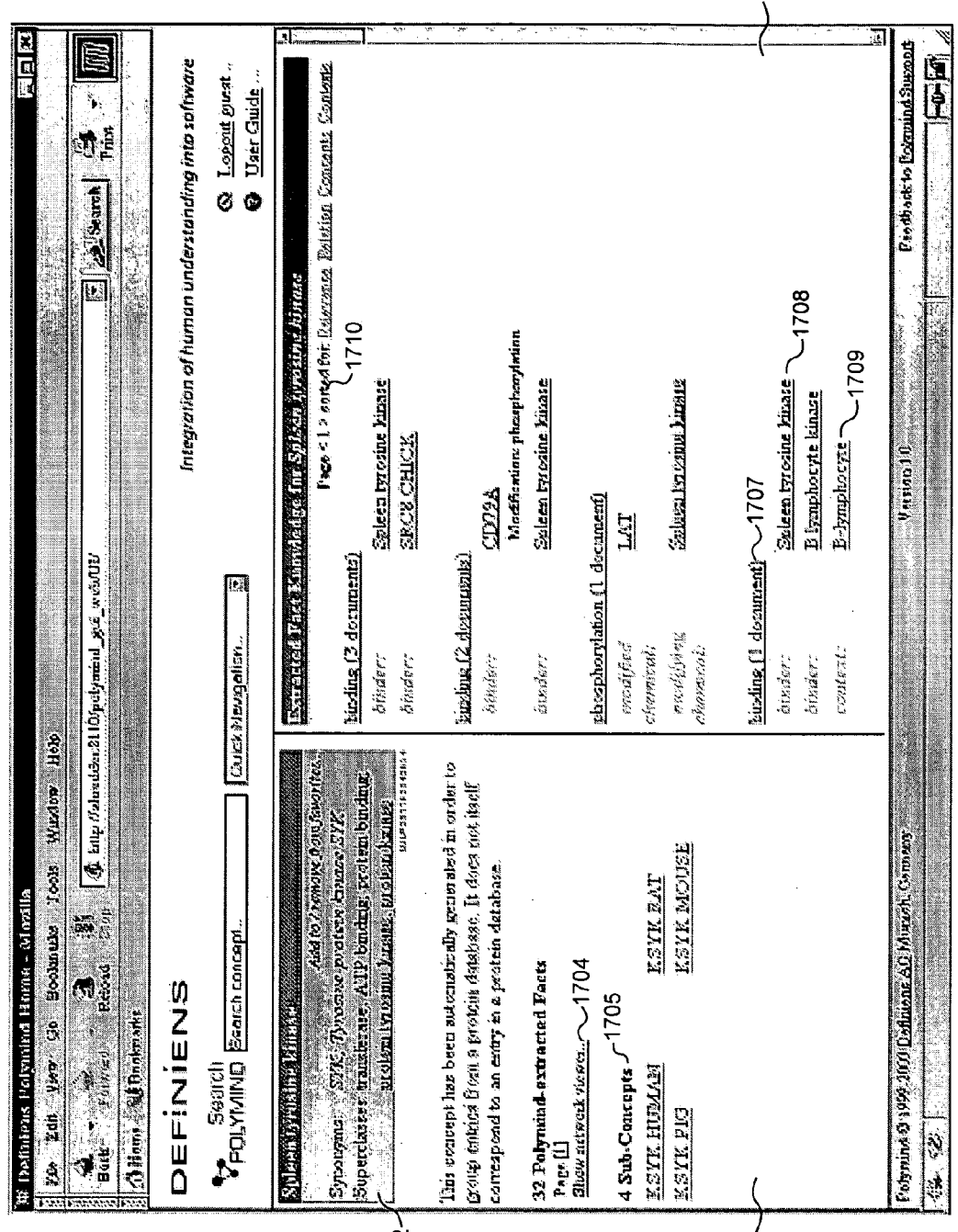
FIG. 17 is a screen shot of a web client for searching for information of extracted knowledge.
Figure 18:
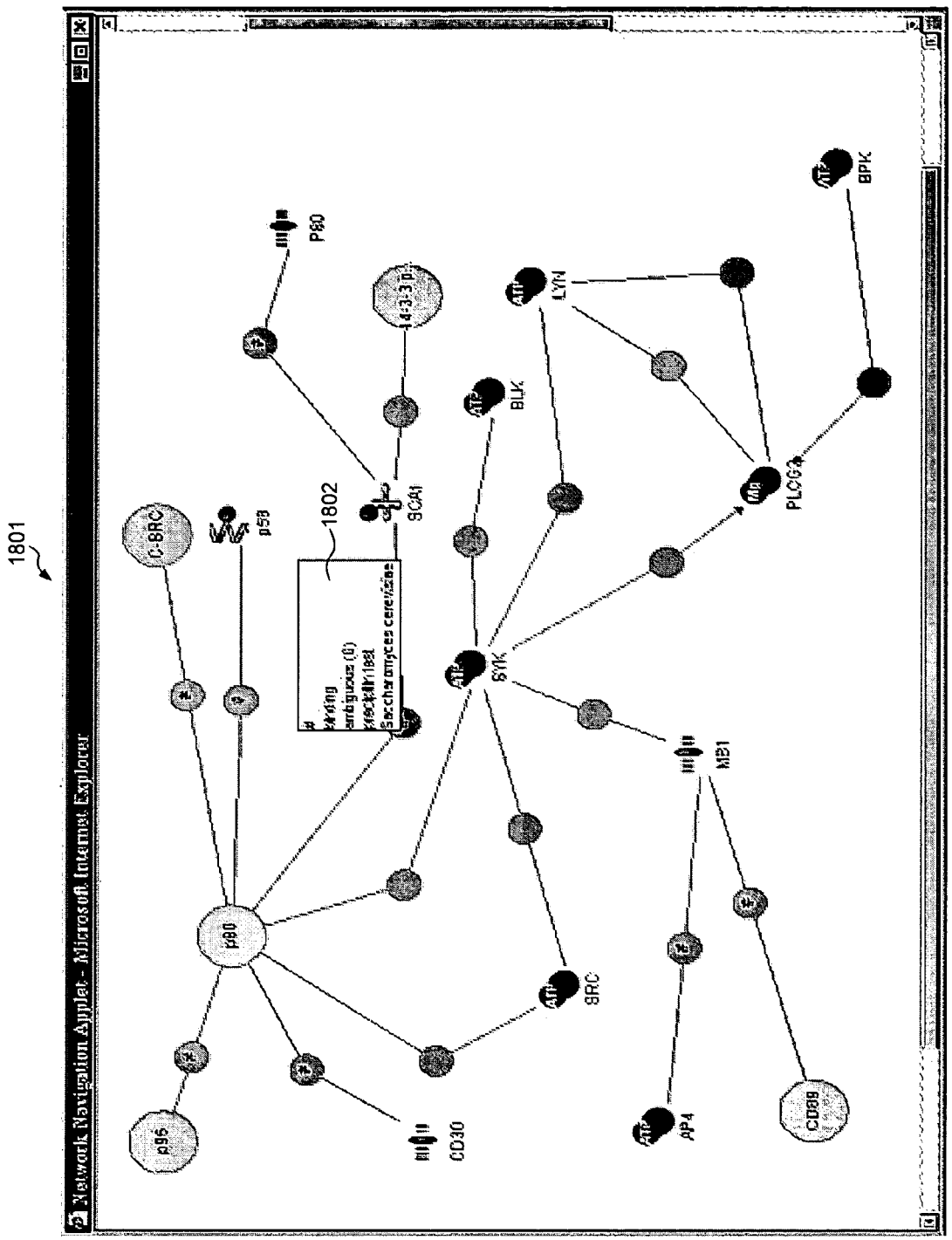
FIG. 18 is a screen shot of a knowledge network viewer representing extracted knowledge.

FIG. 17 shows an example of how extracted fact knowledge for "spleen tyrosine kinase" may be represented. At 1702 there are listed synonyms and superclasses of the corresponding phrase. At 1704 there is the possibility to choose the presentation of the extracted facts by means of a network viewer 1801 as shown in FIG. 18, for example. The block 1802 is an information box showing more detailed information about a corresponding node of the shown network of extracted facts.

At 1705 sub-concepts are listed. On the right hand side 1706 of the web client 1701 concepts and associated slots are shown as well as a possible context 1709 of respective matched documents. At 1710 it may be selected how the information may be sorted, i.e., for relevance, relation, concepts or contexts.

In summary, the lexemes are classified into predicates and non-predicates. A predicate is an element which can only be meaningfully instantiated in a sentence when further specified by other elements (arguments) with semantic reference, e.g., go (predicate) as opposed to dog (not a predicate).

Furthermore, a relationship between a predicate and an argument thereof may be classified as a lexical government, and another relationship between a first lexeme and a second lexeme that constrains the scope (reference) of the first lexeme (which may or may not be a predicate) as a non-lexical government. The reference-constraining lexeme in the second case is called a satellite, for example. Lexical government relationships can generally be determined from deep-syntactic parser information, and non-lexical government relationships from the surface-syntactic parse information or tree. Lexical and non-lexical government are mutually exclusive. If lexemes are related at both levels of parsing, only lexical government is determined, for example, i.e., the deep-syntactic level takes priority. It is, however, possible for a lexeme X to lexically govern a lexeme Y where Y simultaneously non-lexically governs X, as in the phrase "a crying baby".

Both lexical and non-lexical government could be further divided into subtypes.

Furthermore, a predicate argument may be named or labeled to reflect the semantic role thereof.

The grammatical text elements max be classified into operators and coordinators. The following types may be recognized as operators, for example:

a) Relators (e.g., that, which). A relator expresses the fact that a lexeme specified earlier in a sentence is an argument of a predication occurring later in that same sentence. Above a relator in the surface-syntactic parse tree hierarchy, there must, for example, be either a noun or a coordinator pointing to nouns and this is the text element to which the relator points.

b) Determiners (e.g. the, a). A determiner generally contextualizes the reference of a lexeme either with respect to other lexemes or extra-linguistically. Above a determiner in the surface-syntactic parse tree hierarchy, there must be, for example, a noun or a coordinator pointing to nouns and this is the text element to which the determiner points.

c) Adpositions (e.g., in, on, at). An adposition expresses information about the role played by the governed element in a government relationship. Above an instance of genitive "s" in the surface-syntactic parse tree hierarchy, there must be, for example, a noun or a coordinator pointing to nouns and this is the text element to which the instance of genitive "s" points.

d) Auxiliaries (e.g., can, may). An auxiliary typically modifies the tense and/or modality of a verb. For example, auxiliary instances of "be", "can" and "do" must stand in a specific deep-syntactic relation to any verb, whilst auxiliary instances of "need" must stand in a specific deep-syntactic relation to instances of the lexeme "to". An auxiliary points to the element it stands in the required deep-syntactic relation to, for example.

e) Subordinators (e.g., to, that). A subordinator links two predicates in a government relationship.

As a coordinator there may be recognized the words "and" and "or", for example.

The first semantic text networks are built, for example, in that words of said text documents form nodes, wherein links between the nodes capture grammatical relationships between the corresponding words thereof. The same may apply to the words of the text passages to be located, which are built into the second semantic text networks.

The coordinators may form links between corresponding nodes of a respective semantic text network and, additionally, may form nodes which link corresponding coordinated nodes to another node.

There may be matched single words of the second semantic text networks to single words in the first semantic text networks, wherein, for example, a respective match is determined if a single word of the first semantic text networks correspond to the same word or a synonym or hyponym of the corresponding word of the second semantic text networks.

Furthermore, whole text passages (also referred to as input text) of the text documents, which are at least partly building the first semantic text networks, may be matched to the second semantic text networks. A match is determined, for example, if said text passage has the same semantic structure as the second semantic text network and/or the words of said text passage are of the same classification as the corresponding words of the second semantic text network and/or the words of the text passage are matching corresponding words of the second semantic text network and/or each link between corresponding nodes of the corresponding first semantic text networks has the same classification as the corresponding link in the corresponding second semantic text network. Link classifications may for example include names or labels of predicate argument roles.

The text passages to be located (also referred to as template phrases) may be specified by means of at least one template. Said template may be specified or defined by a user having knowledge about the meaning of the text passage to be located. Single words of the text passage to be located may be selectable for matching. The user, for example, then may select one or more single words of the text passage to be located, which must match the words in the text documents. Furthermore, a so called matchability may be defined or restricted in that, for example, only the same word or synonyms or hyponyms are matched.

Preferably, a respective concept and/or slot are selected from the ontology as a basis for matching a single word.

Further preferably, the concept and/or slot are selectable independently from the words of the text passage to be located. That means that it is possible to specify a concept and/or slot that does not correspond to the word itself. This is useful where a concept name, for example, consists of more than one word, e.g. "negative regulation", and this concept name is not recognized as a multiword. In this case it is possible to choose just "regulation" as the word to which this concept name is to correspond.

Two or more second semantic networks may be combined for matching, wherein the results of the matching of one second semantic network may be used by another second semantic network. This reduces the number of second semantic networks to be built.

Furthermore, the context of the text passage in the text document may be considered in matching. This means, that, for example, when a text passage to be located has been located from the text document, a so called context word or context phrase containing more than one word is further located in the sentence of the text passage in the text document. This may be extended to the context of the text passage in the same paragraph etc.

Additionally, the negation status and/or the modality status of the text passage in the text document may be determined. Thus, it is possible to not only match the text passage to be located, but also determine the status of the located or matched text passage in the text document.

Further additionally, multiwords of the text passage in the text document may be matched instead of only matching the single words thereof.

Preferably, one word of a corresponding second semantic text network is determined as a trigger word for starting the step of matching.

In another embodiment, a computer program product which in cooperation with a computer or a computer system directly or, after performing a predetermined routine, executes a method for searching for text passages in text documents as described above. Furthermore, a computer program product, indirectly constitutes a system for searching for text passages in text documents as described above.

In yet another embodiment, a computerized method for predication- and ontology-based semantic language processing is provided, comprising the steps of transforming a text on the basis of surface-syntactic and deep-syntactic information to generate a semantic network structure, linguistically processing said semantic network structure based on information about other parts of said semantic network structure to improve accuracy of at least parts of said semantic network structure, and classifying nodes in said semantic network structure by linking said nodes in said semantic network structure to nodes in a pre-existing ontological network structure representing concepts in a language. Furthermore, a computerized system for executing such a method is provided.

The implementations shown in the figures are only exemplary for the invention, wherein details of the examples shown in combination may also be realized as a single feature alone. That means, for example, that the features or options shown in the template editor 1601 of FIG. 16 need not be realized in combination as shown in the FIG. 16, but may be realized alone as single features independent of the other features or options.

Possible applications for the method and system according to the invention are, for example, knowledge extraction of protein-protein interactions, knowledge extraction or search for text passages in patent data bases, and security services.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A computerized method for searching for text passages in text documents, comprising:
   (a) parsing said text documents to obtain syntactic text information about said text documents;
   (b) processing said syntactic text information to obtain semantic text information about said text documents, wherein said processing is performed by a computer;
   (c) building said semantic text information into first semantic text networks;
   (d) linking said first semantic text networks to an ontology; wherein the ontology includes concepts and relationship slots, wherein each of the concepts defines an entity, and wherein each of the relationship slots defines a binary relation between two concepts;
   (e) generating second semantic text networks from said text passages; and
   (f) matching said first semantic text networks to second semantic text networks by specifying meanings of said text passages to find said text passages in said text documents.

2. The method of claim 1, wherein said syntactic text information includes surface-syntactic information and deep-syntactic information.

3. The method of claim 1, further comprising:
   (g) linking said second semantic text networks to said ontology.

4. The method of claim 1, wherein said first semantic text networks and said second semantic text networks have the same meta structure.

5. The method of claim 1, wherein knowledge is extracted from said text documents as a result of said matching in (f).

6. The method of claim 5, wherein said knowledge is stored and can be searched.

7. The method of claim 5, wherein said knowledge is derived from nodes of said first semantic text networks according to rules specified in association with said second semantic text networks.

8. The method of claim 1, wherein said text documents include words, further comprising:
   (g) classifying said words into lexemes and grammatical text elements.

9. The method of claim 8, further comprising:
   (h) determining where said grammatical text elements are pointing to.

10. The method of claim 9, further comprising:
    (i) building a chain of one or more of said grammatical text elements, said chain including a last grammatical text element, wherein each of said grammatical text elements in said chain, except said last grammatical text element, points to an additional grammatical text element, and wherein said last grammatical text element points to a lexeme.

11. The method of claim 8, wherein a chain comprises one or more grammatical text elements, further comprising:
    (h) building a composition comprising a lexeme, one or more grammatical text elements, and one or more chains.

12. The method of claim 8, further comprising:
    (h) classifying said lexemes into predicates and arguments.

13. The method of claim 12, wherein a predicate has a corresponding argument, and wherein said corresponding argument is classified to reflect a semantic role of said corresponding argument.

14. The method of claim 12, further comprising:
(i) classifying a relationship between a first lexeme and a second lexeme, wherein said relationship is a lexical government if said first lexeme is a predicate and said second lexeme is an argument, and wherein said relationship is a non-lexical government in all other cases.

15. The method of claim 8, further comprising:
(h) classifying said grammatical text elements into operators and coordinators.

16. The method of claim 8, wherein said words form associated nodes of said first semantic text networks, and wherein links between said associated nodes capture grammatical relationships between said words of said associated nodes, further comprising:
(h) classifying said grammatical text elements into operators and coordinators, wherein said coordinators link said associated nodes to form coordinated associated nodes, and wherein said coordinators form additional nodes that link an associated node to corresponding coordinated associated nodes.

17. The method of claim 1, wherein said text documents include words, wherein said words form associated nodes of said first semantic text networks, and wherein links between said associated nodes capture grammatical relationships between said words of said associated nodes.

18. The method of claim 1, wherein a first single word of said first semantic text networks is matched to a second single word of said second semantic text networks if said first single word and said second single word are identical or if said first single word is a synonym or a hyponym of said second single word.

19. The method of claim 1, wherein said first semantic text networks include a first text passage, wherein said first text passage includes words, wherein said second semantic text networks include words, wherein said first text passage is matched to said second semantic text networks if (i) said first text passage has a semantic structure identical to that of said second semantic text networks, (ii) corresponding words of said words of said first text passage and of said words of said second semantic text networks are classified identically, (iii) corresponding words of said words of said first text passage and of said words of said second semantic text networks are identical, are synonyms, or are hyponyms, or (iv) each link between associated nodes of said first semantic text networks is classified identically to a corresponding link between associated nodes of said second semantic text networks.

20. The method of claim 19, wherein said first text passage is determined using a template.

21. The method of claim 20, wherein said template is specified by a user.

22. The method of claim 21, wherein one of said words of said first text passage is selected for matching.

23. The method of claim 22, wherein said one of said words of said first text passage is matched based on a relationship slot of said ontology.

24. The method of claim 23, wherein said relationship slot is selected independently from said words of said first text passage.

25. The method of claim 24, wherein matching of words of said second semantic text networks produces results, and wherein said results are used in matching words of a group of additional semantic text networks.

26. The method of claim 22, wherein said first text passage has a context within said text documents, and wherein said context is used in said matching.

27. The method of claim 26, wherein a negation status and a modality status of said first text passage is determined.

28. The method of claim 27, wherein said first text passage includes multiwords, and wherein said multiwords are matched.

29. The method of claim 28, wherein a word of said second semantic text networks is a trigger word for starting said matching in (f).

30. A tangible computer-readable medium comprising computer-executable instructions for searching for text passages in text documents by performing the steps of:
(a) parsing said text documents to obtain syntactic text information about said text documents;
(b) processing said syntactic text information to obtain semantic text information about said text documents;
(c) building said semantic text information into first semantic text networks;
(d) linking said first semantic text networks to an ontology; wherein the ontology includes concepts and relationship slots, wherein each of the concepts defines an entity, and wherein each of the relationship slots defines a binary relation between two concepts;
(e) generating second semantic text networks from said text passages; and
(f) matching said first semantic text networks to second semantic text networks by specifying meanings of said text passages to find said text passages in said text documents.

31. The computer-readable medium of claim 30, further for performing the step of:
(g) extracting knowledge from said text documents as a result of said matching in (f).

32. A computerized system for searching for text passages in text documents, comprising
means for parsing said text documents to obtain syntactic text information about said text documents;
means for processing said syntactic text information to obtain semantic text information about said text documents and for building said semantic text information into first semantic text networks, wherein said processing is performed by a computer;
an ontology that is linked to said first semantic text networks, wherein said ontology includes concepts and slots, wherein each of the concepts defines an entity, and wherein each of the slots defines a binary relation between two concepts; and
means for matching said first semantic text networks to second semantic text networks and for specifying meanings of said text passages to find said text passages in said text documents.

* * * * *